(12) United States Patent
Seita et al.

(10) Patent No.: US 11,964,435 B2
(45) Date of Patent: Apr. 23, 2024

(54) METHOD AND SYSTEM FOR MONITORING A POWDER BED PROCESS IN ADDITIVE MANUFACTURING

(71) Applicant: NANYANG TECHNOLOGICAL UNIVERSITY, Singapore (SG)

(72) Inventors: Matteo Seita, Singapore (SG); Tan-Phuc Le, Singapore (SG)

(73) Assignee: Nanyang Technological University, Singapore (SG)

(*) Notice: Subject to any disclaimer, the term of this patent is extended or adjusted under 35 U.S.C. 154(b) by 537 days.

(21) Appl. No.: 17/272,148

(22) PCT Filed: Aug. 30, 2019

(86) PCT No.: PCT/SG2019/050432
§ 371 (c)(1),
(2) Date: Feb. 26, 2021

(87) PCT Pub. No.: WO2020/046212
PCT Pub. Date: Mar. 5, 2020

(65) Prior Publication Data
US 2021/0331399 A1 Oct. 28, 2021

(30) Foreign Application Priority Data
Aug. 30, 2018 (SG) .............................. 10201807457T

(51) Int. Cl.
*B29C 64/205* (2017.01)
*B29C 64/386* (2017.01)
(Continued)

(52) U.S. Cl.
CPC .......... *B29C 64/386* (2017.08); *B29C 64/205* (2017.08); *B33Y 30/00* (2014.12);
(Continued)

(58) Field of Classification Search
CPC ..... B29C 64/386; B29C 64/205; B29C 64/20; B29C 64/393; B29C 64/153; B33Y 30/00;
(Continued)

(56) References Cited

U.S. PATENT DOCUMENTS

2015/0367578 A1\* 12/2015 Arisoy .................. G05B 15/02
703/2
2016/0214319 A1 7/2016 Wiel et al.
(Continued)

FOREIGN PATENT DOCUMENTS

WO 2017/089510 A1 6/2017
WO 2017/108762 A1 6/2017

OTHER PUBLICATIONS

Foster et al., "A brief survey of sensing for metal-based powder bed fusion additive manufacturing," *Proceedings of SPIE*, vol. 9489, 2015, 9 pages.
(Continued)

*Primary Examiner* — Jonathan M Hansen
(74) *Attorney, Agent, or Firm* — Seed IP Law Group LLP

(57) ABSTRACT

There is provided a method of monitoring a powder bed process in additive manufacturing, using at least one processor. The method including: obtaining a first image of a powder bed layer from scanning the powder bed layer in a first scanning direction using a first contact image sensor, the powder bed layer being formed by a powder re-coater arm in the powder bed process and the first contact image sensor being attached to the powder re-coater arm; determining a focus level property of the first image; and detecting non-uniformities in the powder bed layer based on the focus level property of the first image. There is also provided a corresponding system for monitoring a powder bed process.

20 Claims, 21 Drawing Sheets

(51) Int. Cl.
| | |
|---|---|
| *B33Y 30/00* | (2015.01) |
| *B33Y 50/00* | (2015.01) |
| *G01B 11/30* | (2006.01) |
| *G06T 5/70* | (2024.01) |
| *G06T 7/00* | (2017.01) |

(52) U.S. Cl.
CPC ............ *B33Y 50/00* (2014.12); *G01B 11/303* (2013.01); *G06T 5/70* (2024.01); *G06T 7/0004* (2013.01); *G06T 2207/30144* (2013.01)

(58) Field of Classification Search
CPC ....... B33Y 50/00; G01B 11/303; G01B 11/24; G06T 5/002; G06T 7/0004; G06T 2207/30144; G06T 7/529; B22F 10/28; B22F 10/37; B22F 10/85; B22F 12/67; B22F 12/90
See application file for complete search history.

(56) References Cited

U.S. PATENT DOCUMENTS

| | | | |
|---|---|---|---|
| 2016/0349215 A1 | 12/2016 | Todorov | |
| 2018/0099333 A1* | 4/2018 | DehghanNiri | .......... B22F 10/36 |
| 2018/0345582 A1* | 12/2018 | Schade | ................... B22F 12/67 |

OTHER PUBLICATIONS

Abdelrahman et al., "Flaw detection in powder bed fusion using optical imaging," *Additive Manufacturing* 15:1-11, 2017.
Ali et al., "On the measurement of relative powder-bed compaction density in powder-bed additive manufacturing processes," Accepted Manuscript to appear in *Materials & Design*, revised May 28, 2018, 19 pages.
Bidare et al., "Laser powder bed fusion at sub-atmospheric pressures," *International Journal of Machine Tools and Manufacture* 130-131:65-72, 2018.
Bin Anwar et al., "Srudy of the spatter distribution on the powder bed during selective laser melting," Preprint submitted to *Additive Manufactruing*, dated Aug. 31, 2018, 29 pages.
Craeghs et al., "Online Quality Control of Selective Laser Melting," *Proceedings of the Solid Freeform Fabrication Symposium*, 2011, pp. 212-226.
Cumberbatch, "Self-focusing in Non-linear Optics," *J. Inst. Maths Applics* 6:250-262, 1970.
Foster et al., "Optical, layerwise monitoring of powder bed fusion," *Solid Free. Fabr. Proc.*, 2015, pp. 295-307.
Gasser et al., "Laser Additive Manufacturing—Laser Metal Deposition (LMD) and Selective Laser Melting (SLM) in Turbo-Engine Applications," *Laser Material Processing* 2:58-63, Apr. 2010.
Goh et al., "Assessment of Areal (Three-Dimensional) Roughness Parameters of Milled Surface Using Charge-Coupled Device Flatbed Scanner and Image Processing," *Experimental Techniques*, 2015, pp. 1-9.
Gong et al., "Analysis of defect generation in Ti—6Al—4V parts made using powder bed fusion additive manufacturing processes," *Additive Manufacturing* 1-4:87-98, 2014.
Grasso et al., "Process defects and in situ monitoring methods in metal powder bed fusion: a review," *Meas. Sci. Technol.* 28:044005, 2017, 26 pages.
Gu et al., "Laser additive manufacturing of metallic components: materials, processes and mechanisms," *International Materials Reviews* 57(3):133-164, 2012.
Han et al., "A wide field-of-view scanning endoscope for whole anal canal imaging," *Biomedical Optics Express* 6(2):607-614, Feb. 2015.
Hann, "Powder Reuse and Its Effects on Laser Based Powder Fusion Additive Manufactured Alloy 718," *SAE Int. J. Aerosp.* 9(2):209-213, 2016.
King et al., "Observation of keyhole-mode laser melting in laser powder-bed fusion additive manufacturing," *Journal of Materials Processing Technology*, LLNL-JRNL-642426, Aug. 16, 2013, 36 pages.
Kleszczynski et al., "Error Detection in Laser Beam Melting Systems by High Resolution Imaging," *FFF Work.*, 2012, pp. 975-987.
Kleszczynski et al., "Improving Process Stability of Laser Beam Melting Systems," Fraunhofer Direct Digital Manufacturing Conference, Berlin, Germany, 2014, 7 pages.
Land II, et al., "In-Situ Metrology System for Laser Powder Bed Fusion Additive Process," *Procedia Manufacturing* 1:393-403, 2015.
Li et al., "In Situ 3D Monitoring of Geometric Signatures in the Powder-Bed-Fusion Additive Manufacturing Process via Vision Sensing Methods," *Sensors* 18(1180), 2018, 13 pages.
Nayar, "Shape from Focus," Technical Report, Carnegie Mellon University, The Robotics Institute, 1989, 37 pages.
Pedersen et al., "In-Situ Monitoring in Additive Manufacturing Using Contact Image Sensors," American Society for Precision Engineering, 2016 Summer Topical Meeting vol. 64, pp. 114-118.
Pentland, "A New Sense for Depth of Field," *IJCAI* 1985, pp. 988-994.
Pentland et al., "Simple range cameras based on focal error," *J. Opt. Soc. Am. A* 11(11):2925-2934, Nov. 1994.
Pertuz et al., "Analysis of focus measure operators for shape-from-focus," *Pattern Recognition* 46:1415-1432, 2013.
Salzbrenner et al., "High-throughput Stochastic Tensile Performance of Additively Manufactured Stainless Steel," Submitted to *Journal of Materials Processing Technology*, Jul. 2016, 22 pages.
Tang et al., "Effect of Powder Reuse Times on Additive Manufacturing of Ti-6Al-4V by Selective Electron Beam Melting," *JOM* 67(3):555-563, 2015.
Townsend et al., "Surface texture metrology for metal additive manufacturing: a review," *Precision Engineering* 46:34-47, 2016.
Yoshida et al., "A numerical analysis method for evaluating rod lenses using the Monte Carlo method," *Optics Express* 18(26):27016-27027, Dec. 2010.
Zhang et al., "In situ surface topography of laser powder bed fusion using fringe projection," *Additive Manufacturing* 12:100-107, 2016.
Zheng et al., "0.5 gigapixel microscopy using a flatbed scanner," *Biomedical Optics Express* 5(1):1-8, Jan. 2014.

\* cited by examiner

FIG. 10A
FIG. 10B
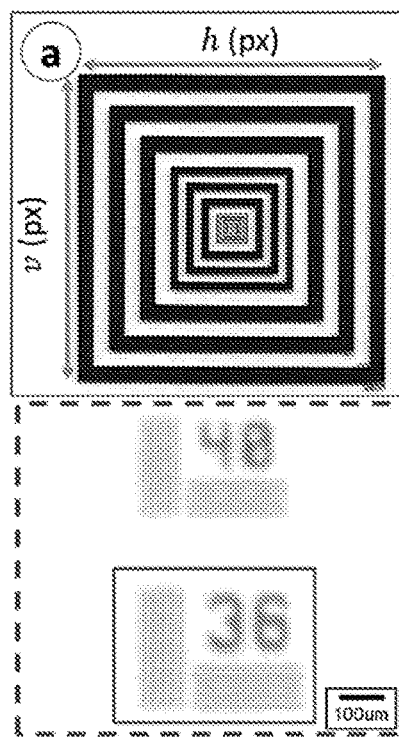
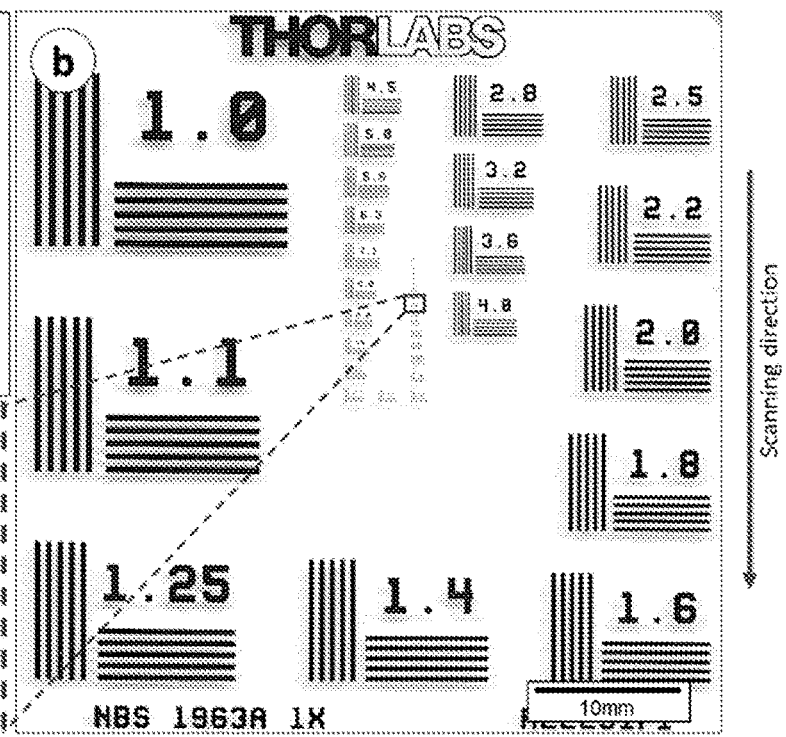

METHOD AND SYSTEM FOR MONITORING A POWDER BED PROCESS IN ADDITIVE MANUFACTURING

CROSS-REFERENCE TO RELATED APPLICATION

This application claims the benefit of priority of Singapore Patent Application No. 10201807457T, filed 30 Aug. 2018, the content of which being hereby incorporated by reference in its entirety for all purposes.

TECHNICAL FIELD

The present invention generally relates to a method and a system for monitoring a powder bed process in additive manufacturing, and more particularly, for detecting non-uniformities in powder bed layer(s) deposited and/or in consolidated material layer(s) formed in the powder bed process.

BACKGROUND

Additive Manufacturing (AM) enables near-net-shape manufacturing of components by fusing feedstock materials together, layer by layer. This process offers the capability of fabricating internal chambers, internal channels, and complicated geometrical shapes, which are generally not achievable via conventional manufacturing techniques. Moreover, this bottom-up manufacturing process reduces material waste, labor cost and provides shorter time to market for applications that require low volume or parts-on-demand productions. These features have attracted the interest of many industries, including the aerospace, automotive, maritime, and biomedical. One of the most frequently employed AM processes in the industry are powder bed fusion (or sintering) and binder jetting, which may also be referred to as powder bed processes (PBPs). PBP involves spreading a layer of powder feedstock material onto a build platform, which is then selectively fused (or sintered) or bounded (or joined) together in the areas where the part is to be formed using a high energy sources or a binding agent, respectively. Subsequently, the build platform is lowered to make space for a new powder bed layer and the sequence is repeated until the part is finished.

Major drawbacks of these PBPs, however, include large variability in the mechanical properties of the produced parts, as well as deviations in part geometry from the original model. These issues are rooted into the local non-uniformities of the spread powder layers, which include variable layer thickness, non-uniform distributions of powder particle packing density and size, and differences in particle chemical composition.

Non-uniformities in the powder bed layer thickness, which may also be referred to as powder bed defects (PBDs), are known to promote the formation of defects in the build, such as internal pores, cracks, or delamination. Examples of PBDs are particle cluster or spatter agglomeration being dragged on the powder bed or damaged re-coater blade leaving traces on the powder surface. Because of their ubiquity across the build platform, PBDs may affect different parts in different ways, causing the measured scatter in performance. Existing monitoring strategies may rely on using digital cameras to image the powder bed at each layer. Albeit cost-effective, such strategies present two main drawbacks. First, because the cameras are mounted off-axis to the powder bed surface normal (to avoid obscuring the high-energy source), the captured images must be corrected for perspective error and distortion, which reduces the accuracy in detecting non-uniformities. Moreover, digital cameras impose a trade-off between spatial resolution and field-of-view. PBDs are small (e.g., of the order of the powder particle size) and may be randomly distributed across the build area (which may span several hundreds of millimeters). As a result, most non-uniformities may go undetected using existing defect monitoring and detection strategies.

Non-uniformities in powder packing density are known to have a negative impact on part density and surface roughness, as well as affecting part shrinkage and warping. There are several factors that affect powder bed packing density, including layer thickness, re-coating speed, re-coater blade type, and particle size and morphology distribution in the powder feedstock. Common methodologies to quantify powder packing density rely on ex-situ measurements of weight-to-volume ratios of small batches of powders, which are extracted from the spread powder layer. These measurements are intensive, error-prone and are not amenable to capturing the powder packing density at each layer.

A need therefore exists to provide a method and a system for monitoring a PBP in additive manufacturing, and more particularly, for detecting non-uniformities in powder bed layer(s) deposited and/or in consolidated material layer(s) formed in the PBP, such as to improve the detection (e.g., accuracy and/or capability) of non-uniformities in powder bed layer(s) deposited and/or in consolidated material layer (s) formed in the PBP. It is against this background that the present invention has been developed.

SUMMARY

According to a first aspect of the present invention, there is provided a method of monitoring a powder bed process in additive manufacturing, using at least one processor, the method comprising: obtaining a first image of a powder bed layer from scanning the powder bed layer in a first scanning direction using a first contact image sensor, the powder bed layer being formed by a powder re-coater arm in the powder bed process and the first contact image sensor being attached to the powder re-coater arm; determining a focus level property of the first image; and detecting non-uniformities in the powder bed layer based on the focus level property of the first image.

According to a second aspect of the present invention, there is provided a system for monitoring a powder bed process in additive manufacturing, the system comprising: a first contact sensor; a memory; and at least one processor communicatively coupled to the memory and the first contact sensor, and configured to: obtain a first image of a powder bed layer from scanning the powder bed layer in a first scanning direction using the first contact image sensor, the powder bed layer being formed by a powder re-coater arm in the powder bed process and the first contact image sensor being attached to the powder re-coater arm; determine a focus level property of the first image; and detect non-uniformities in the powder bed layer based on the focus level property of the first image.

According to a third aspect of the present invention, there is provided an additive manufacturing system configured to perform a powder bed process, the additive manufacturing system comprising: a build platform; a powder feeder configured to dispense powder on the build platform during the powder bed process; a powder re-coater comprising a powder re-coater arm configured to form a powder bed layer on the build platform based on the powder dispensed on the build platform from the power feeder; and a system for monitoring the powder bed process according to the above-described second aspect of the present invention.

According to a fourth aspect of the present invention, there is provided a computer program product, embodied in one or more non-transitory computer-readable storage mediums, comprising instructions executable by at least one processor to perform a method of monitoring a powder bed process in additive manufacturing according to the above-described first aspect of the present invention.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 10A depicts a raw image of a Thorlabs concentric square target acquired using an example powder bed scanner according to various example embodiments of the present invention;

FIG. 10B depicts a raw image of an NBS 1963A resolution target acquired using an example powder bed scanner according to various example embodiments of the present invention;

DETAILED DESCRIPTION

Various embodiments of the present invention provide a method and a system for monitoring a powder bed process (PBP) in additive manufacturing, and more particularly, for detecting non-uniformities in powder bed layer(s) deposited and/or in consolidated material layer(s) formed in the powder bed process. For example, as described in the background, conventional methods for detecting non-uniformities in powder bed layer(s) based on ex-situ measurements are intensive and error-prone, and those based on digital cameras are not capable of detecting small-sized non-uniformities over large-area powder bed layer(s). Accordingly, various embodiments of the present invention provide a method and a system for monitoring a powder bed process in additive manufacturing, and more particularly, for detecting non-uniformities in powder bed layer(s) deposited and/or in consolidated material layer(s) formed in the powder bed process, for improving the detection (e.g., accuracy and/or capability) of non-uniformities in powder bed layer(s) deposited and/or in consolidated material layer(s) formed in the powder bed process.

Figure 1:
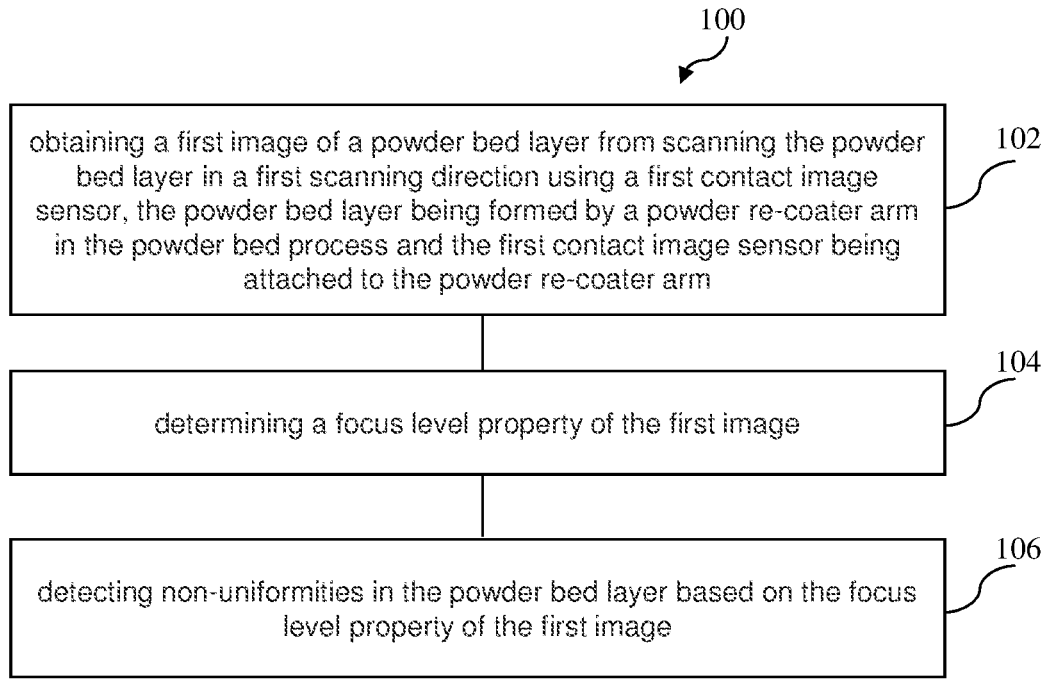
FIG. 1 depicts a schematic flow diagram of a method of monitoring a powder bed process in additive manufacturing, according to various embodiments of the present invention.

FIG. 1 depicts a schematic flow diagram of a method 100 of monitoring a powder bed process in additive manufacturing, using at least one processor, according to various embodiments of the present invention. The method 100 comprises: obtaining (at 102) a first image of a powder bed layer from scanning the powder bed layer in a first scanning direction using a first contact image sensor, the powder bed layer being deposited by a powder re-coater arm in the powder bed process and the first contact image sensor being attached to the powder re-coater arm; determining (at 104) a focus level property of the first image; and detecting (at 106) non-uniformities in the powder bed layer based on the focus level property of the first image.

Various types of powder bed processes in additive manufacturing are known in the art, such as but not limited to, powder bed fusion (or sintering) and binder jetting. Furthermore, a contact image sensor is also known in the art, such as those used in flatbed scanners, which comprises an array (e.g., a line or a row) of photodetectors configured to scan a generally flat area (e.g., of an article or a document) in close proximity (which thus exhibits a relatively narrow depth of field (DOF)) in a first scanning direction (e.g., along a scanning axis, such as an x-axis) generally perpendicular to the direction in which the array of photodetectors extends (e.g., along a y-axis) to generate a two-dimensional (2D) image of the area. The contact image sensor may have a variable or controllable (or adjustable) depth of field, such that the contact image sensor may be configured or set to exhibit a desired depth of field.

In relation to 102, as the first contact image sensor is advantageously attached to the powder re-coater arm according to various embodiments of the present invention, the first contact image sensor moves in a first scanning direction (e.g., along an x-axis) together with the powder re-coater arm as the powder re-coater arm (e.g., comprising a powder re-coater blade) is controlled to move in the same first scanning direction for forming the powder bed layer (e.g., depositing the powder bed layer or spreading the powder to form the powder bed layer). Accordingly, the first contact image sensor may be configured to scan the powder bed layer as the powder bed layer is being formed by the powder re-coater arm. In this regard, accordingly, the first contact image sensor may be attached to a side of the powder re-coater arm facing a direction opposite to the first scanning direction, for example, substantially perpendicular to the scanning axis (e.g., x-axis) and facing (e.g., generally facing) a direction opposite to the first scanning direction. In this manner, the first image obtained may thus be a 2D image of the powder bed layer (a surface thereof) scanned by the first contact image sensor. In various embodiments, the first contact image sensor may be removably attached to the powder re-coater arm or may be permanently or integrally attached to the powder re-coater arm.

In relation to 104, the focus level property of the first image may include focus level parameters (e.g., focus level measures or values), each indicating or representing a degree of focus of image captured at the corresponding region (or kernel) of the first image. In various embodiments, a 2D array of the focus level parameters may be provided spatially covering a corresponding 2D area of the first image. That is, each focus level parameter in the 2D array at a location (e.g., coordinate) or index thereof indicates or represents the degree of focus of the image captured at the corresponding region of the 2D area of the first image spatially.

In relation to 106, in various embodiments, detecting non-uniformities in the powder bed layer may include detecting the presence or absence of non-uniformities in the powder bed layer at location(s) or region(s) (or area(s)) thereof. In various embodiments, detecting non-uniformities in the powder bed layer may include (e.g., further include) detecting (e.g., determining or quantifying) a degree (e.g., level or severity) of non-uniformities in the powder bed layer. That is, in various embodiments, not only does the method 100 detect the presence or absence of non-uniformities in the powder bed layer at location(s) or region(s) thereof, the method 100 further detects a degree of such non-uniformities in the powder bed layer at such location(s) or region(s) thereof. In various embodiments, non-uniformities in the powder bed layer may refer to any portion or region of the powder bed layer having properties or characteristics that deviates or are different from ideal (e.g., uniform) or those desired (e.g., reference) or acceptable, such as but not limited to, non-uniform powder layer thickness. For example, non-uniformities in the powder layer thickness may also be referred to as powder bed defects (PBDs). Examples of PBDs may be particle cluster or spatter agglomeration being dragged on the powder bed or damaged re-coater blade leaving traces on the powder layer surface. PBDs may also promote the formation of defects in the build, such as but not limited to, geometric deviations from the original or intended model, internal pores, cracks or delamination.

Accordingly, various embodiments of the present invention advantageously provide a method of monitoring a powder bed process in additive manufacturing, and more particularly, for detecting non-uniformities in power bed layer(s) based on a focus level property of the first image, which has been found to be efficient and effective in detecting non-uniformities in powder bed layer(s), thus improving the detection of non-uniformities in powder bed layer(s) and as a result, improving the quality of the object formed.

In various embodiments, the above-mentioned determining a focus level property of the first image comprises determining (e.g., generating) a focus level map of the first image. In various embodiments, for example, the focus level map may be in the form of the above-described 2D array of the focus level parameters. In various embodiments, the focus level map may be expressed or illustrated graphically, such as in the form of an image, based on the focus level parameters (focus level values). For example, different focus level values may uniquely correspond to different colors or shades of gray (grayscale).

In various embodiments, the focus level map of the first image is determined (e.g., generated) based on a modified Laplacian-based focus measure operator. In various other embodiments, the focus level map of the first image may be determined based on another type of focus measure operator as desired or as appropriate, such as but not limited to, a gradient-based operator, a wavelet-based operator, a statistic-based operator or a DCT-based operator.

In various embodiments, the above-mentioned determining a focus level property of the first image further comprises performing a smoothening operation on the focus level map based on a box filter to obtain a smoothened focus level map. This, for example, advantageously reduces the resolution of the focus level map generated based on the focus measure operator and provides a resultant or smoothened focus level map that is less "noisy".

In various embodiments, the box filter comprises a window size parameter determined based on a resolution of the first image. For example, the resolution may be expressed as dots-per-inch (DPI). In various embodiments, the window size parameter of the box filter may also be determined based on powder particle size and/or feature size. In various embodiments, the window size parameter of the box filter may be determined based on the characterization desired to be performed. For example, for powder bed uniformity measurement, the window size parameter may be based on the size of powder particles that have been deposited on the powder bed and captured in the focus level map. For example, for consolidated (melted) surface, similarly, the consolidated surface is captured in the focus level map and the window size parameter of the box filter may be based on the melted surface conditions/features, e.g., surface roughness, melt-pool size, laser melting hatch distance, and so on. Accordingly, in various embodiments, the window size parameter of the box filter may be determined such that it both removes or minimizes unwanted noises and retains or maximizes important information in the focus level map.

In various embodiments, the above-mentioned detecting non-uniformities in the powder bed layer comprises: applying a threshold condition to the smoothened focus level map; and identifying one or more regions (e.g., portions or areas) of the powder bed layer corresponding to one or more regions (e.g., portions or areas) of the smoothened focus level map satisfying the threshold condition as having non-uniformities. For example, the threshold condition may be predefined or predetermined, such as less than a predefined threshold value, which may be expressed as an absolute value or as a percentage (e.g., 40%) with respect to a reference value (e.g., a maximum focus level value). In this manner, region(s) of the smoothened focus level map satisfying the threshold condition may then be identified as having non-uniformities for corresponding region(s) of the powder bed layer.

In various embodiments, the method 100 further comprises quantifying the focus level map of the first image to obtain a topography map of the first image. For example, the topography map may be in the form of a 2D array of distance parameters (e.g., distance measures or values) with respect to a focal plane, each indicating or representing a distance of the powder bed layer determined at the corresponding location or region from the focal plane. Accordingly, similar to the focus level map, the 2D array of distance parameters may be provided spatially covering a corresponding 2D area of the first image. That is, each distance parameter in the 2D array at a location (e.g., coordinate) or index thereof indicates or represents the distance of the powder bed layer determined at the corresponding location or region of the 2D area of the first image spatially. In various embodiments, also similar to the focus level map, the topography map may be expressed or illustrated graphically, such as in the form of an image, based on the distance parameters (e.g., distance values). For example, different distance values may uniquely correspond to different colours or shades of gray (grayscale).

In various embodiments, the above-mentioned quantifying the focus level map comprises mapping focus level values in the focus level map to corresponding distances with respect to a focal plane to obtain the topography map.

In various embodiments, the above-mentioned mapping focus level values is based on an inversed Gaussian distance fitting function.

In various embodiments, the above-mentioned detecting non-uniformities in the powder bed layer comprises determining a degree (e.g., level or severity) of non-uniformities in the powder bed layer based on the topography map of the first image. For example, region(s) of the topography map having higher distance value(s) may indicate a larger variation (e.g., deviation) in thickness from an ideal (e.g., uniform) or desired (e.g., reference) thickness at the corresponding region(s) of the powder bed layer.

In various embodiments, the method 100 further comprises: obtaining a reference topography map (or background topography map) of a reference powder bed layer free of non-uniformities (or substantially free of non-uniformities or within an acceptable level or degree); and correcting the topography map of the first image based on the reference topography map of the reference powder bed layer. In this manner, for example, unwanted or undesired artifacts appearing in the images (e.g., the first image) obtained from the contact image sensor (e.g., the first contact image sensor) may advantageously be minimized or eliminated.

In various embodiments, the method further comprises controlling a movement speed of the powder re-coater arm for scanning the powder bed layer in the first scanning direction based on an image acquisition rate of the first contact image sensor. In this regard, the movement speed of the powder re-coater arm may be synchronized to the image acquisition rate (e.g., based on the image resolution acquisition setting) of the first contact image sensor.

In various embodiments, the method 100 further comprises: obtaining a second image of a consolidated material layer from scanning the consolidated material layer in a second scanning direction, opposite to the first scanning direction, using the first contact image sensor, the consolidated material layer being formed with respect to the powder bed layer; determining a focus level property of the second image; and detecting non-uniformities in the consolidated material layer based on the focus level property of the second image.

In various embodiments, the consolidated material layer may be formed by selectively fusing (e.g., based on powder bed fusion) or binding (or joining) (e.g., based on binder jetting) together powder particles at selected areas or regions of a powder bed layer in a powder bed process.

In various other embodiments, the method 100 further comprises: obtaining a second image of a consolidated material layer from scanning the consolidated material layer in the first scanning direction using a second contact image sensor, the consolidated material layer being formed with respect to an immediately previous powder bed layer and the second contact image sensor being attached to the powder re-coater arm at an opposite side thereof with respect to the first contact image; determining a focus level property of the second image; and detecting non-uniformities in the consolidated material layer based on the focus level property of the second image.

In various embodiments, the first contact image sensor may be attached to a first side of the powder re-coater arm facing a direction opposite to the first scanning direction (e.g., substantially perpendicular to the scanning axis (e.g., x-axis)) and facing (e.g., generally facing) a direction opposite to the first scanning direction In various embodiments, the second contact image sensor may be attached to a second side of the powder re-coater arm facing a direction the same as the first scanning direction (e.g., substantially perpendicular to the scanning axis) and facing (e.g., generally facing) a direction the same as the first scanning direction.

In other words, the first and second contact image sensors may be attached to the powder re-coater arm at opposite sides thereof. It will be appreciated to a person skilled in the art that a first surface at the first side of the powder re-coater arm on which the first contact image sensor may be attached, and the second surface at the second side of the powder re-coater arm on which the second image sensor may be attached, may have any orientation as appropriate or desired, for example, substantially perpendicular to the scanning axis or diagonally orientated with respect to the scanning axis. Accordingly, as the powder re-coater arm is being moved in the first scanning direction to form the powder bed layer, the first contact image sensor attached to the first side of the powder re-coater arm may scan the powder bed layer (thus generating the first image) and the second contact image sensor attached to the second side of the powder re-coater arm may scan the consolidated material layer (formed with respect to the immediately previous powder bed layer) (thus generating the second image), simultaneously.

It will be appreciated that the step of determining the focus level property of the second image may be performed in the same or similar manner as the step of determining the focus level property of the first image as described herein according to various embodiments, except that the focus level property is determined with respect to the second image instead of the first image. Therefore, the step of determining the focus level property need not be repeated with respect to the second image for clarity and conciseness. In other words, various embodiments described herein in relation to determining the focus level property of an image in the context of the first image is analogously or equivalently valid for the second image.

It will also be appreciated that the step of detecting non-uniformities in the consolidated material layer based on the focus level property of the second image may be performed in the same or similar manner as the step of detecting non-uniformities in the consolidated material layer based on the focus level property of the first image as described herein according to various embodiments, except that the non-uniformities is determined with respect to the consolidated material layer based on the focus level property of the second image instead of the powder bed layer based on the focus level property of the first image. Therefore, the step of detecting non-uniformities need not be repeated with respect to the consolidated material layer for clarity and conciseness. In other words, various embodiments described herein in relation to detecting non-uniformities in a layer based on the focus level property of an image in the context of the powder bed layer based on the focus level property of the first image is analogously or equivalently valid for the consolidated material layer based on the focus level property of the second image.

In various embodiments, non-uniformities in the consolidated material layer may refer to any portion or region of the consolidated material layer having properties or characteristics that deviate or are different from ideal (e.g., uniform) or those desired (e.g., reference) or acceptable, such as but not limited to, non-uniformities in the consolidated material layer thickness (e.g., grooves or surface depressions in the consolidated material layer).

In various other embodiments, the method 100 further comprises: obtaining a second image of the powder bed layer from scanning the powder bed layer in the first scanning direction using a second contact image sensor, the second contact image sensor being attached to (e.g., directly or indirectly) the powder re-coater arm at a same side thereof as the first contact image sensor and at a different distance from the powder bed layer to be scanned compared to the first contact image sensor; determining a focus level property of the second image; and determining, for each of one or more regions of the powder bed layer detected as having non-uniformities, whether the region having non-uniformities is a protrusion (or a protrusion-type) or a depression (or a depression-type) based on the focus level property of the second image at a corresponding region thereof. In this regard, the first and second contact image sensors may be attached to the same side (e.g., the first side) of the powder re-coater arm, but at different distances from (e.g., above) the powder bed layer to be scanned. Accordingly, as the powder re-coater arm is being moved in the first scanning direction to form the powder bed layer, the first and second contact image sensors attached to the first side of the powder re-coater arm may scan the powder bed layer (thus generating the first and second images) simultaneously, but at different operating distances (or different working distances). For example, such a configuration may advantageously be employed to acquire multiple images (e.g., the first and second images) at different operating distances, which may for example facilitate in determining whether various non-uniformities in power layer thickness identified are protrusions or depressions. It will be appreciated by a person skilled in the art that the different operating distances may be configured or set as desired or as appropriate. It will be appreciated that the step of determining the focus level property of the second image may be performed in the same or similar manner as the step of determining the focus level property of the first image as described herein according to various embodiments, except that the focus level property is determined with respect to the second image instead of the first image and at a different operating distance. Therefore, the step of determining the focus level property need not be repeated with respect to the second image for clarity and conciseness.

It will be appreciated by a person skilled in the art the powder bed process involves forming an object layer by layer, and thus, non-uniformities in other powder bed layers and/or consolidated material layers formed in the powder bed process may also be detected in the same or similar manner as the powder bed layer and/or consolidated material layer described hereinbefore according to various embodiments. Accordingly, in various embodiments, the method 100 of monitoring a powder bed process may detect non-uniformities in a plurality of (e.g., each of) the powder bed layers and/or consolidated material layers formed in the powder bed process.

Figure 2:
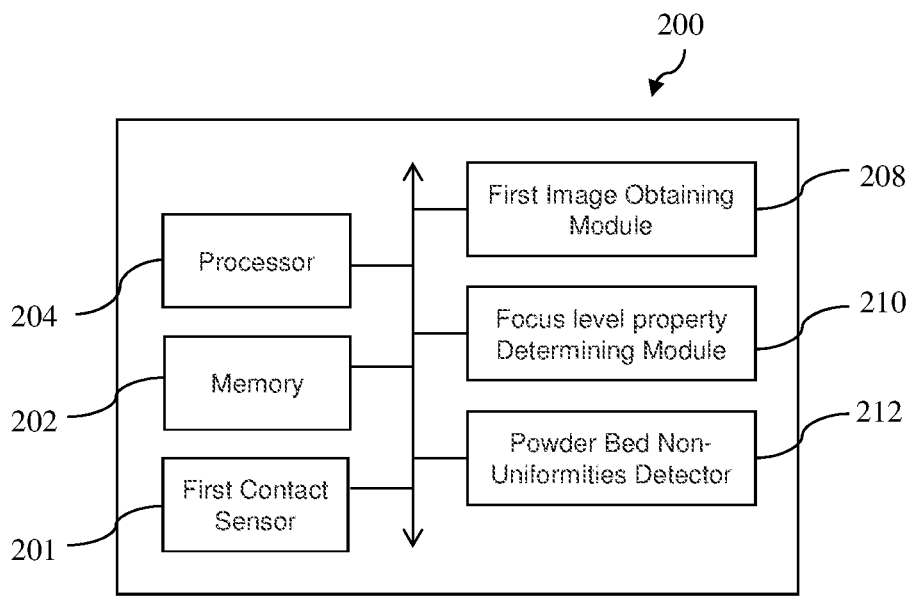
FIG. 2 depicts a schematic block diagram of a system (or monitoring system) for monitoring a powder bed process in additive manufacturing according to various embodiments of the present invention.

FIG. 2 depicts a schematic block diagram of a system (which may also be referred to as a monitoring system) 200 for monitoring a powder bed process in additive manufacturing according to various embodiments of the present invention, such as corresponding to the method 100 of monitoring a powder bed process in additive manufacturing using at least one processor as described hereinbefore according to various embodiments of the present invention. The system 200 comprises a first contact sensor 201, a memory 202, and at least one processor 204 communicatively coupled to the memory 202 and the first contact sensor 201, and configured to: obtain a first image of a powder bed layer from scanning the powder bed layer in a first scanning direction using the first contact image sensor 201, the powder bed layer being formed by a powder re-coater arm in the powder bed process and the first contact image sensor 201 being attached to the powder re-coater arm; determine a focus level property of the first image; and detect non-uniformities in the powder bed layer based on the focus level property of the first image.

It will be appreciated by a person skilled in the art that the at least one processor 204 may be configured to perform the required functions or operations through set(s) of instructions (e.g., software modules) executable by the at least one processor 204 to perform the required functions or operations. Accordingly, as shown in FIG. 2, the system 200 may further comprises a first image obtaining module (or first image obtaining circuit) 208, a focus level property determining module (or focus level property determining circuit) 210 and a powder bed non-uniformities detector (or powder bed non-uniformities detecting module or circuit) 212, according to various embodiments of the present invention. The first image obtaining module 208 is configured to obtain a first image of a powder bed layer from scanning the powder bed layer in a first scanning direction using the first contact image sensor 201, the powder bed layer being formed by a powder re-coater arm in the powder bed process and the first contact image sensor 201 being attached to the powder re-coater arm; the focus level property determining module 210 is configured to determine a focus level property of the first image; and the powder bed non-uniformities detector 212 is configured to detect non-uniformities in the powder bed layer based on the focus level property of the first image. It will be appreciated to a person skilled in the art that the system 200 may be embodied as a device or an apparatus.

It will be appreciated by a person skilled in the art that the above-mentioned modules are not necessarily separate modules, and one or more modules may be realized by or implemented as one functional module (e.g., a circuit or a software program) as desired or as appropriate without deviating from the scope of the present invention. For example, the first image obtaining module 208, the focus level property determining module 210 and the powder bed non-uniformities detector 212 may be realized (e.g., compiled together) as one executable software program (e.g., software application or simply referred to as an "app"), which for example may be stored in the memory 202 and executable by the at least one processor 204 to perform the functions/operations as described herein according to various embodiments.

In various embodiments, the system 200 for monitoring a powder bed process corresponds to the method 100 of monitoring a powder bed process as described hereinbefore with reference to FIG. 1, therefore, various functions or operations configured to be performed by the least one processor 204 may correspond to various steps of the method 100 described hereinbefore according to various embodiments, and thus need not be repeated with respect to the system 200 for clarity and conciseness. In other words, various embodiments described herein in context of the methods are analogously valid for the respective systems (e.g., which may also be embodied as devices), and vice versa.

For example, in various embodiments, the memory 202 may have stored therein the first image obtaining module 208, the focus level property determining module 210 and/or the powder bed non-uniformities detector 212, which respectively correspond to various steps of the method 100 as described hereinbefore according to various embodiments, which are executable by the at least one processor 204 to perform the corresponding functions/operations as described herein.

A computing system, a controller, a microcontroller or any other system providing a processing capability may be provided according to various embodiments in the present disclosure. Such a system may be taken to include one or more processors and one or more computer-readable storage mediums. For example, the system 200 described hereinbefore may include a processor (or controller) 204 and a computer-readable storage medium (or memory) 202 which are for example used in various processing carried out therein as described herein. A memory or computer-readable storage medium used in various embodiments may be a volatile memory, for example a DRAM (Dynamic Random Access Memory) or a non-volatile memory, for example an EEPROM (Electrically Erasable Programmable Read-Only Memory), or a flash memory, e.g., a floating gate memory, a charge trapping memory, an MRAM (Magnetoresistive Random Access Memory) or a NVRAM (Non-Volatile Random-Access Memory).

In various embodiments, a "circuit" may be understood as any kind of a logic implementing entity, which may be a special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "obtaining", "determining", "detecting", "applying", "identifying", "quantifying", "mapping", "correcting", "controlling" or the like, refer to the actions and processes of a computer system (e.g., which may also be embodied as an electronic device), that manipulates and transforms data represented as physical quantities within the computer system into other data similarly represented as physical quantities within the computer system or other information storage, transmission or display devices.

The present specification also discloses a system (e.g., which may also be embodied as a device or an apparatus) for performing the operations/functions of the methods described herein. Such a system may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated by a person skilled in the art that various modules described herein (e.g., the first image obtaining module 208, the focus level property determining module 210 and/or the powder bed non-uniformities detector 212) may be software module(s) realized by computer program(s) or set(s) of instructions (e.g., including algorithms) executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., corresponding to the first image obtaining module 208, the focus level property determining module 210 and/or the powder bed non-uniformities detector 212) executable by one or more computer processors to perform a method 100 of monitoring a powder bed process in additive manufacturing as described hereinbefore with reference to FIG. 1. Accordingly, various computer programs or modules described herein may be stored in a computer program product receivable by a system therein, such as the system 200 as shown in FIG. 2, for execution by at least one processor 204 of the system 200 to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

It will be appreciated by a person skilled in the art that the system 200 for monitoring a powder bed process may be embodied as a separate (stand-alone) unit or embodied as a functional unit/component of an apparatus or a system (e.g., a machine) for additive manufacturing (additive manufacturing apparatus or system) configured to perform a powder bed process.

Figure 3:
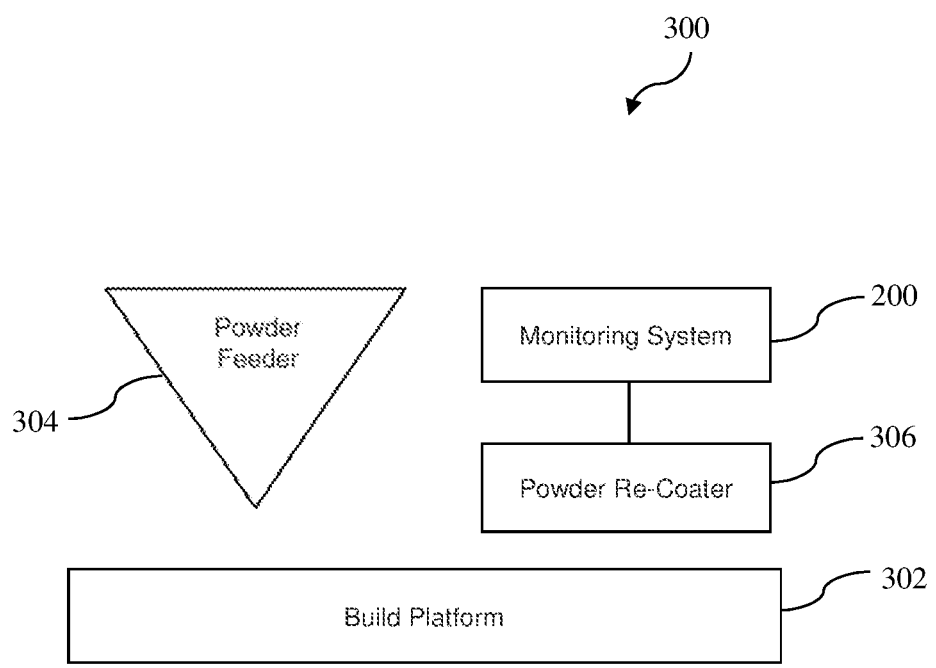
FIG. 3 depicts a schematic block diagram of an additive manufacturing system, including the monitoring system shown in FIG. 2, configured to perform a powder bed process according to various embodiments of the present invention.

FIG. 3 depicts a schematic block diagram of an additive manufacturing system 300 configured to perform a powder bed process according to various embodiments of the present invention. The additive manufacturing system 300 comprises: a build platform 302; a powder feeder 304 configured to dispense powder on the build platform 302 during the powder bed process; a powder re-coater 306 comprising a powder re-coater arm configured to form a powder bed layer on the build platform 302 based on the powder dispensed on the build platform 302 from the power feeder 304; and a system (monitoring system) 200 for monitoring the powder bed process as described hereinbefore according to various embodiments with reference to FIG. 2. Various components of an additive manufacturing system 300 configured to perform a powder bed process, such as the build platform 302, the powder feeder 304 and the powder re-coater 306 are known in the art and thus need not be described herein for clarity and conciseness. In various embodiments, the system 200 may be installed or implemented in (e.g., integrated in) an existing additive manufacturing system (e.g., a commercially available) configured to perform a powder bed process. In various embodiments, various modifications to the existing additive manufacturing system may be made as desired or as appropriate.

Figure 4:
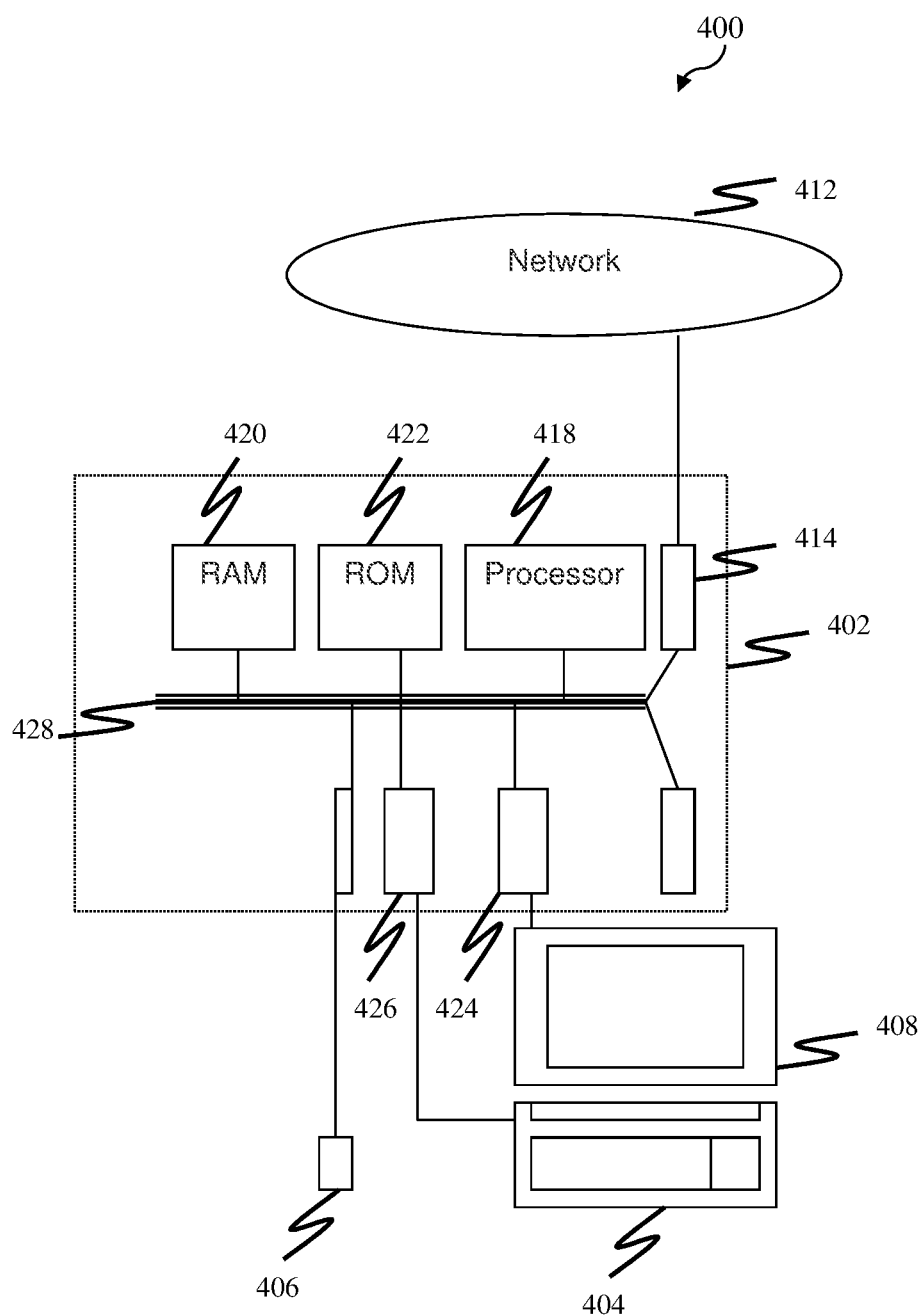
FIG. 4 depicts a schematic block diagram of an exemplary computer system which may be used to realize or implement the monitoring system as depicted in FIG. 2.

In various embodiments, the system 200 may be realized by any computer system (e.g., portable or desktop computer system, such as tablet computers, laptop computers, mobile communications devices (e.g., smart phones), and so on) including at least one processor and a memory, and communicatively coupled to a contact image sensor, such as a computer system 400 as schematically shown in FIG. 4 as an example only and without limitation. Various methods/steps or functional modules (e.g., the first image obtaining module 208, the focus level property determining module 210 and/or the powder bed non-uniformities detector 212) may be implemented as software, such as a computer program being executed within the computer system 400, and instructing the computer system 400 (in particular, one or more processors therein) to conduct the methods/functions of various embodiments described herein. The computer system 400 may comprise a computer module 402, input modules, such as a keyboard 404 and a mouse 406, and a plurality of output devices such as a display 408. The computer module 402 may be connected to a computer network 412 via a suitable transceiver device 414, to enable access to e.g., the Internet or other network systems such as Local Area Network (LAN) or Wide Area Network (WAN). The computer module 402 in the example may include a processor 418 for executing various instructions, a Random Access Memory (RANI) 420 and a Read Only Memory (ROM) 422. The computer module 402 may also include a number of Input/Output (I/O) interfaces, for example I/O interface 424 to the display 408, and I/O interface 426 to the keyboard 404. The components of the computer module 402 typically communicate via an interconnected bus 428 and in a manner known to the person skilled in the relevant art.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

Figure 5:
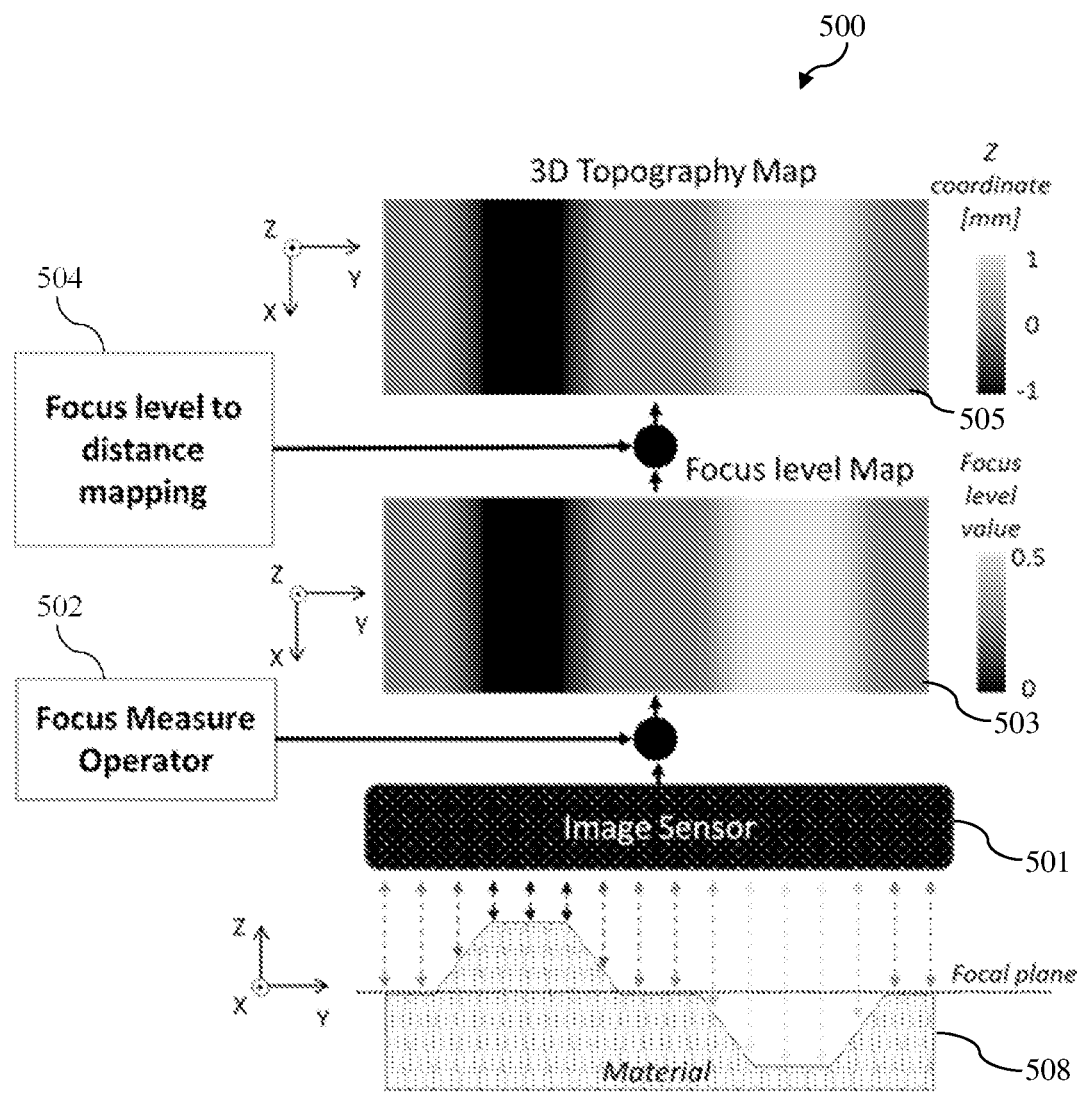
FIG. 5 depicts a schematic flow diagram of a method for assessing 3D topographic information from the surface of materials employed in additive manufacturing technology, according to various example embodiments of the present invention.

According to various example embodiments, there is provided a powder layer characterization method, which combines particle-level resolution with large field of view. The method may rely on using a linear sensor (e.g., contact image sensor) to acquire either grayscale or color scans of the powder layer. Owing to fast image acquisition speed of the linear sensor, the method may advantageously be applied to quantify powder layer non-uniformities during PBPs. According to various example embodiments, by choosing a sensor that exhibits narrow depth of field (DOF), the method is capable of reconstructing the 3D topography of the powder bed layer from a 2D image, and thus quantify variations in powder bed layer thickness. Indeed, because of the narrow DOF, regions of the surface that are above or below the focal plane appear out-of-focus. Some of these regions may reveal the presence of defects or irregularities in the surface of the materials deposited during additive manufacturing, such as powder-bed defects, super-elevated edges or grooves, cracks, porosity, deformed geometries, and so on. It is thereby valuable to be able to detect and characterize the geometry of such features (defects). According to various example embodiments, by quantifying the focus level values in the images taken by the sensor with narrow DOF, and by converting these values into ground-truth distances from the focal plane, it is possible to directly measure the surface 3D topography of each layer of material deposited or formed during the additive manufacturing process, including powder bed layers and consolidated layers of material. As a result, it is possible to locate defects or irregularities and to quantify their physical properties, such as height or depth, orientation, slope, and so on. A schematic flow diagram of the method 500 is shown in FIG. 5 according to various example embodiments of the present invention. In particular, FIG. 5 depicts a schematic flow diagram of a method 500 for assessing 3D topographic information from the surface of materials employed in additive manufacturing technology, according to various example embodiments of the present invention (e.g., corresponding to the method 100 of monitoring a powder bed process in additive manufacturing as described hereinbefore according to various embodiments). The method 500 is based on the quantification of focus levels using, for instance, a focus measure operator 502 and converting the focus levels into ground-truth distances using a mapper 504 configured to map focus levels to corresponding distances. In particular, as shown in FIG. 5, the method 500 includes obtaining an image of a powder bed layer 508 (a surface thereof) from scanning the powder bed layer 508 in a scanning direction (e.g., along the x-axis in FIG. 5) using a contact image sensor 501; determining a focus level property (e.g., focus level map 503) of the image based on the focus measure operator 502; and quantifying the focus level map 503 of the image to obtain a topography map 505 of the image based on the mapper 504.

In addition to retrieving surface topography of powder layers, the method 500 may be employed to map powder particle density distribution across the powder bed as well as the level of oxidation of individual particles, which appear with different colors. The method 500 may also be used to inspect the surface quality of the materials that are consolidated during PBPs (e.g. solid metals, polymers, and ceramics that undergo melting or sintering during the additive process). Because of its high-resolution and large field-of-view, the method 500 is amenable to image the entire build area at a sub-10 μm resolution level.

All this information may be acquired in-line and layer by layer during the PBP. Therefore, according to various example embodiments, the method 500 may be used to monitor the additive manufacturing process and predict the quality of the builds, or in closed-loop to adjust the process parameters and correct for the local non-uniformities and improve the quality of the builds.

Figure 6:
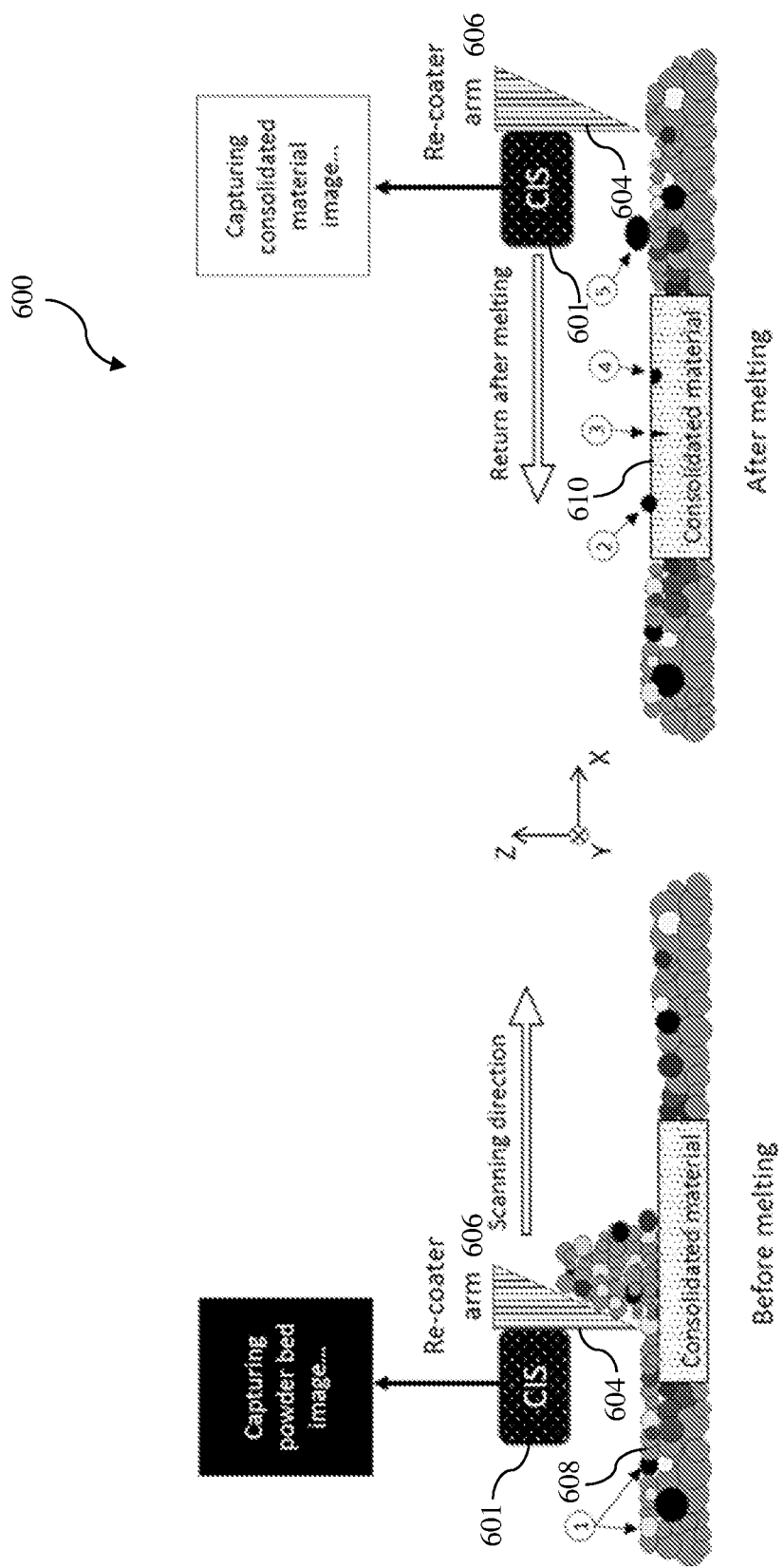
FIG. 6 depicts a schematic view of a method of monitoring a powder bed process based on powder bed fusion (PBF) technology, where only one contact image sensor is attached to a side of a powder re-coater arm, according to various example embodiments of the present invention.

FIG. 6 depicts a schematic view of a method 600 of monitoring a powder bed process based on powder bed fusion (PBF) technology according to various example embodiments of the present invention, where a contact image sensor (CIS) unit 601 is integrated only on a back-side 604 of a powder re-coater arm 606. The CIS unit 601 may be configured to scan a powder bed layer 608 as it is deposited and standby without returning to original position. After the melting or fusion process is finished, the CIS unit 601 scans the newly consolidated surface (consolidated material layer) 610 and by-products during the returning scan.

In various example embodiments, one or more CIS units may be provided and integrated with the powder re-coater arm 604 of a PBF system. During PBF, three dimensional (3D) parts may be built by scanning a thermal energy source (e.g., either a laser or an electron beam) on a thin layer of powder particles (e.g., typically between 40 μm to 100 μm thick) to selectively sinter or fuse them together, layer after layer. After sintering or melting of the powder particles, a new powder layer is deposited on top of the build platform using a powder re-coater. By connecting or attaching CIS unit(s) to the powder re-coater arm 604, images of the powder bed, images of the consolidated material layer (after sintering or melting of the powders), as well as of the by-products created during the melting process (e.g. spattering, balling, etc.) can be acquired as the powder re-coater arm 604 moves. In various example embodiments, the image acquisition process may be the same or similar to that of a flatbed document scanner, whereby images are acquired using a CIS unit that is swept across the page of the document by a moving arm. Employing CIS unit(s) for the described method is advantageous because the CIS unit(s) are characterized by a narrow DOF, inexpensive, and combine high spatial resolution (e.g., down to about 5.2 μm) with large field of view, enabling rapid and high-throughput inspection of surfaces of materials.

In the same embodiments, during the powder re-coating process, the CIS unit 601 may capture either grayscale or color images of the newly deposited powder layer (a surface thereof). For example, this enables rapid inspection of powder feedstock quality (e.g., denoted by (1) in FIG. 6), including powder age, powder particle size and shape distribution, powder packing density, powder flowability and powder shortage detection. Instead of returning to the original position immediately, the powder re-coater arm 606 may wait until the fusing or melting process is finished. On the returning scan, the CIS unit 601 may capture images of the consolidated material layer 610 (a surface thereof), as well as of the by-products created during the melting process. This allows quick examination of the consolidated layer geometric dimension, surface roughness, surface pores and cracks (e.g., denoted by (3) and (4) in FIG. 6), surface darkening, and spattering and balling distribution (e.g., denoted by (2) and (5) in FIG. 6).

Moreover, by scanning the CIS unit 601 on the printing substrate at the beginning without depositing powder, beneficial information such as substrate quality and substrate tilting error can be obtained to provide necessary correction before printing process started.

Figure 7A:
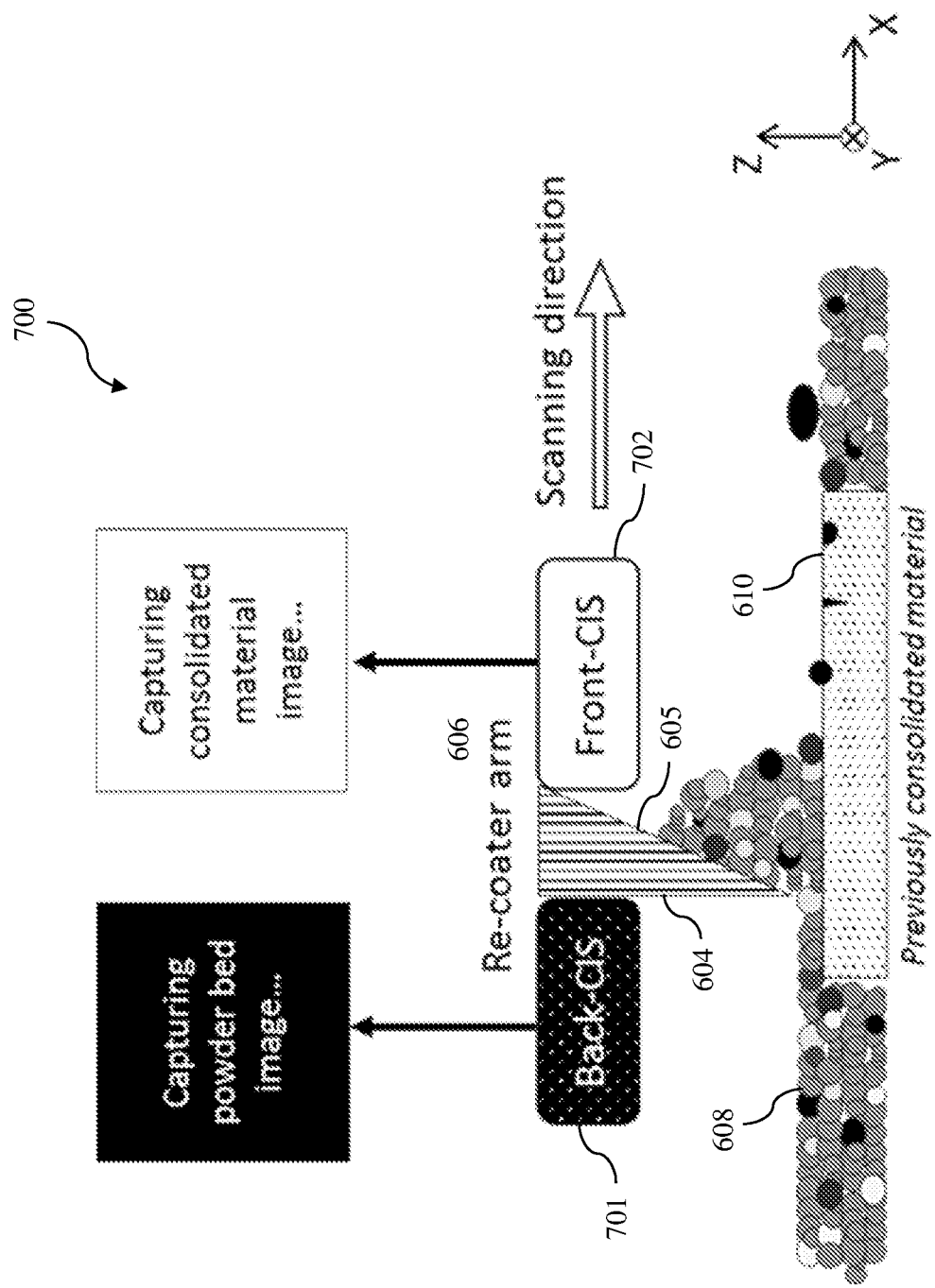
FIG. 7A depicts a schematic view of a method of monitoring a powder bed process based on PBF technology, where two contact image sensors are attached to opposite sides of a powder re-coater arm, according to various other embodiments of the present invention.

FIG. 7A depicts a schematic view of a method 700 of monitoring a powder bed process based on PBF technology according to various other embodiments of the present invention, involving two CIS units 701, 702. The back-side CIS unit 701 may be configured to scan the powder bed layer 608 as it is deposited. The front-side CIS unit 702 may be configured to scan the material that was consolidated (consolidated material layer) 610 during the deposition of the previous layer (immediately previous layer). When reverting the scanning direction (i.e., after the powder re-coater arm 606 reaches the end of the build platform), the back-side CIS unit 701 may be configured to function as a front-side CIS unit and vice-versa.

Accordingly, by connecting two CIS units 701, 702 to the powder re-coater arm 606 (one to a front side 604 and one to a back side 605 of the powder re-coater arm 606), it is possible to simultaneously image the powder bed layer 608 (a surface thereof) (using the back-side CIS unit 701) while it is being deposited as well as the surface of the material that was consolidated (consolidated material layer) 610 in the previous layer (using the front-side CIS unit 702) as the powder re-coater arm 606 moves back and forth across the build platform, as schematically shown in FIG. 7A. It will be appreciated to a person skilled in the art that the definition of back-side and front-side CIS unit may be used with reference to the scanning direction. For example, when the scanning direction is inverted, namely along the negative x-axis, the back-side CIS unit 701 becomes the front-side CIS unit and vice-versa. Capturing of powder bed and consolidated material images can be performed at each layer throughout the build, enabling quality control over the entire print.

Accordingly, with the back-side CIS unit 701, the powder bed layer 608 can be monitored on the fly as the powder is being deposited. In various example embodiments, by quantifying the focus levels in the powder bed images, for example, it is possible to assess the geometry of different types of powder bed defects, which may require different correction strategies. Super-elevated defects, for instance, may signal the presence of extraneous particles on the powder bed, which may be removed through an additional re-coating operation. Conversely, grooves in the powder bed layer 608 may indicate that the powder re-coater blade is damaged and needs to be changed before continuing the print. With the front-side CIS unit 702, for example, it is possible to scan the surface of the consolidated materials (consolidated material layer) 610 just ahead of the powder re-coater arm 606. Similarly, by quantifying the focus levels in the images of consolidated material layer 610, for example, it is possible to assess the geometry of different surface features before the powder re-coater arm 606 interacts with them. For example, this capability advantageously prevents the powder re-coater arm 606 from crashing into super-elevated edges or protrusions that may emerge on the surface of the consolidated material 610, thereby preserving the blade and the quality of the layers to follow. By detecting these edges promptly, for example, it may be possible to level them down with an additional sweep of the high-power source, after setting the power to a level that is commensurate to the size of the edges. Non-uniformities, such as grooves or surface depressions, in the consolidated material layers 610 may be detected in a similar manner. These non-uniformities or features may undesirably yield the formation of porosity in the build. For example, in various example embodiments, a selective re-deposition of a controlled amount of materials may fill these defects and limit porosity.

Figure 7B:
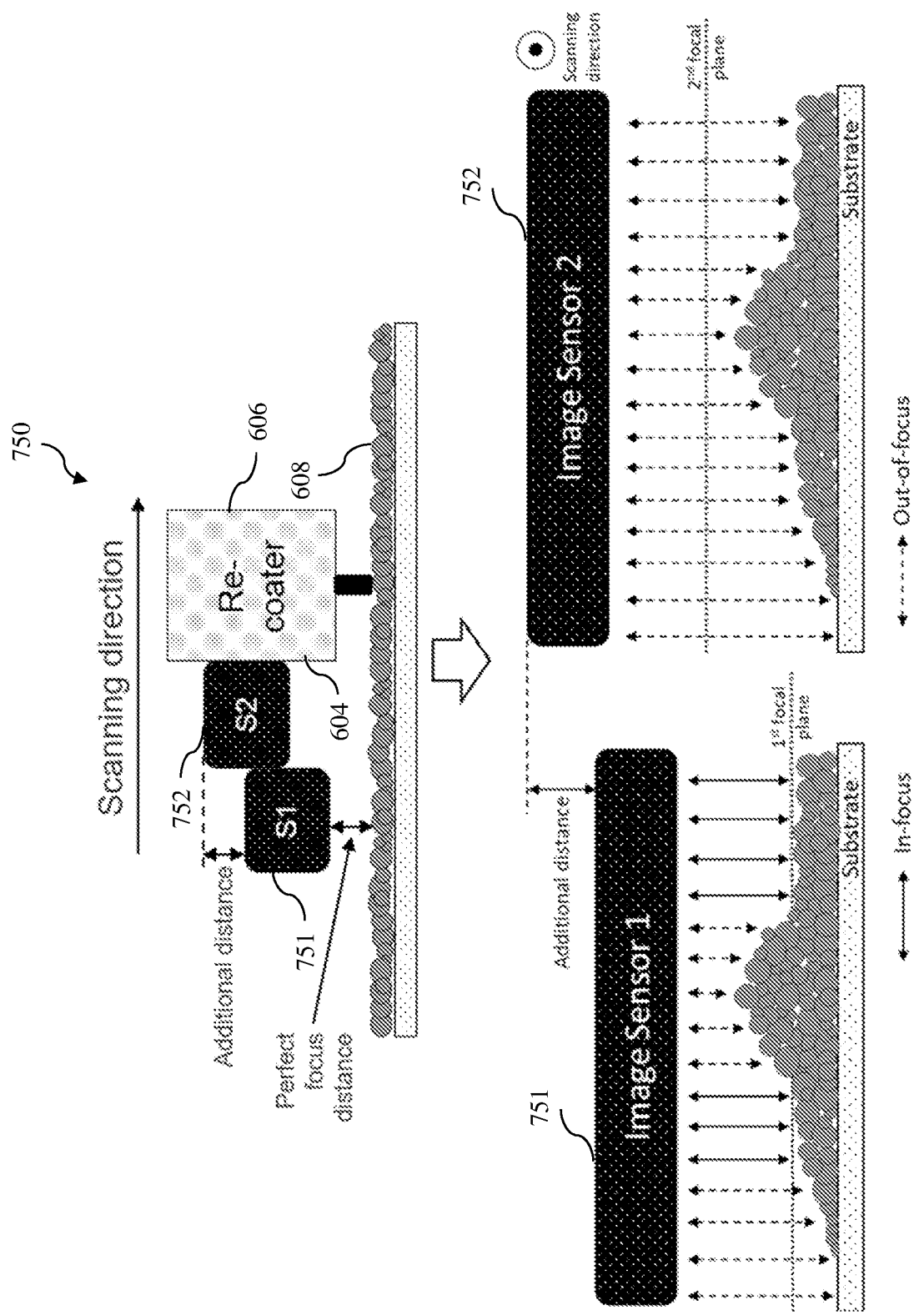
FIG. 7B depicts a schematic view of a method of monitoring a powder bed process based on PBF technology, where two contact image sensors are attached to the same side of a powder re-coater arm, but at different distances from the powder bed layer to be scanned, according to various other embodiments of the present invention.

FIG. 7B depicts a schematic view of a method 750 of monitoring a powder bed process based on PBF technology according to various example embodiments of the present invention, where a first contact image sensor 751 and a second contact image sensor 752 are attached to the same side (e.g., first side) 604 of the powder re-coater arm 606, but at different distances from the powder bed layer 608 to be scanned. In various example embodiments, the first contact image sensor 751 may be mounted to the first side at a perfect-focus distance, whereas the second contact image sensor 752 may be mounted at a longer (higher) working distance than the first contact image sensor 751, such that all the non-uniformities on the powder bed layer 608 (including protrusions and depressions) as well as the uniform portion of the powder bed layer 608 fall into the over-focus distance of the second contact image sensor 752. Thus, as long as the protrusions (e.g., bumps or hills on the powder bed layer 608) are not higher than the additional working distance the second contact image sensor 752 has, such protrusions can be distinguished or identified. In various example embodiments, the additional working distance added to the second contact image sensor 752 may be determined by the highest or a height limit (e.g., predetermined) of the protrusions on the powder bed layer 608.

Figure 14:
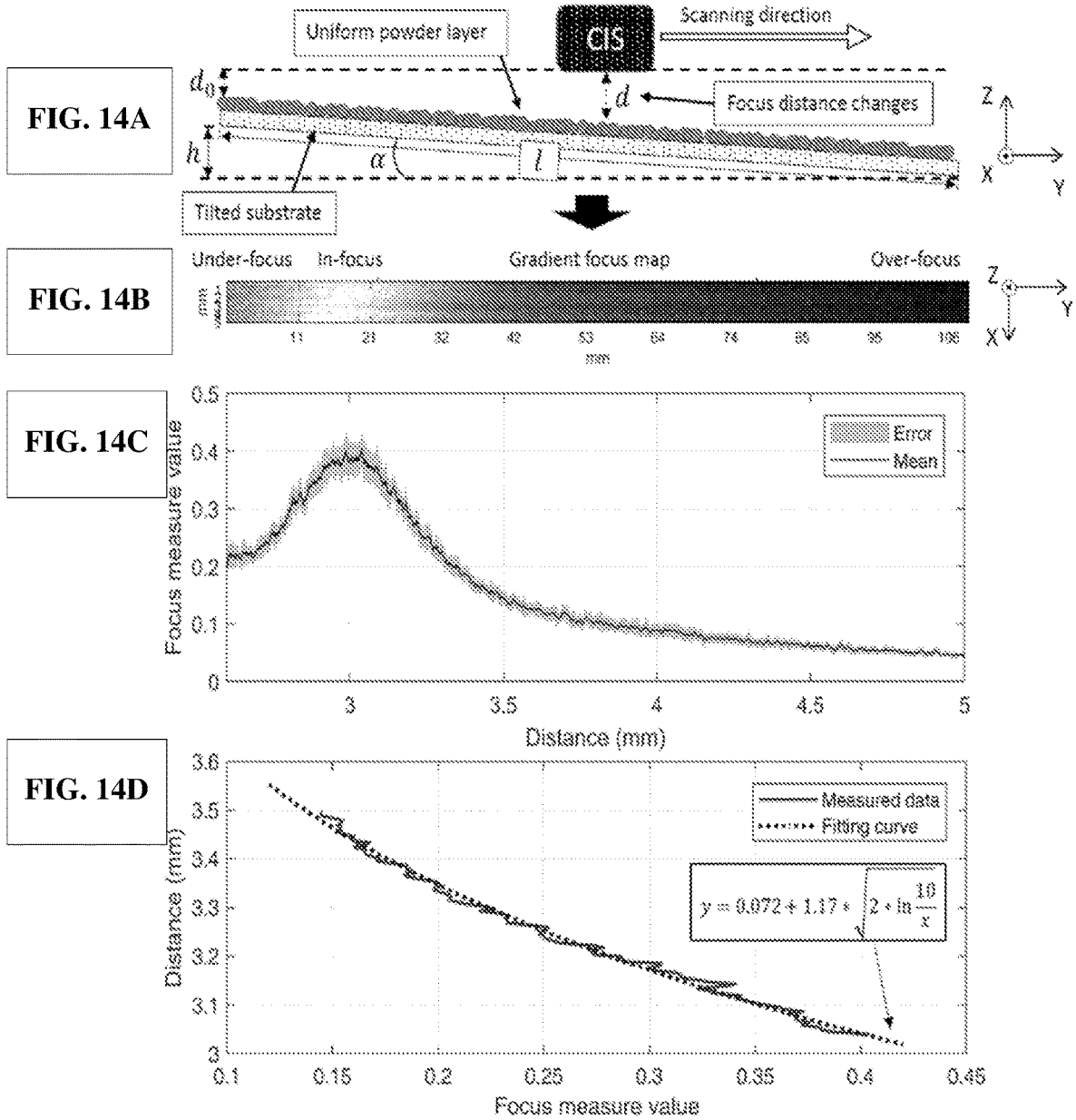
FIGS. 14A to 14D depict an example method of obtaining a function for mapping focus level values in a focus level map to corresponding distances with respect to a focal plane, according to various example embodiments of the present invention.

By way of an example only for illustration purpose and without limitation, the perfect focus distance of the first and second contact image sensors 751, 752 may be the same at 3 mm. There may exist two defects, namely, a depression at +0.2 mm with respect to the focal plane (i.e., 3.2 mm distance to sensor) and a protrusion at −0.2 mm with respect to the focal plane (i.e., 2.8 mm distance to sensor). Using only the first contact image sensor 751 at the perfect focus distance would thus result in both defects being at the same distance (i.e., +0.2 mm) because they have the same focus level. By attaching the second contact image sensor at, for example, 0.5 mm higher than the first contact image sensor 751, acquiring the second focus level map and converting to distance map (topology map), the obtained depression would be at +0.7 mm, the correct powder bed layer would be at +0.5 mm and the protrusion would be at +0.3 mm. By subtracting the second focus distance map by 0.5 mm (distance difference), the returned results for the depression, correct powder layer and protrusion would then be +0.2 mm, 0 mm and −0.2 mm, respectively. Referring to FIG. 14C, the curve represents a relationship between focus value and distance to the sensor, which exhibits a steep slope±0.5 mm around the focus peak (3 mm). This means that within this range, the conversion from focus value to distance is more accurate due to the higher signal-to-noise ratio. As it goes beyond 3.5 mm, the change in focus value becomes increasingly smaller or insignificant, which makes it more susceptible to noises. Accordingly, in various example embodiments, 0.5 mm higher in working distance for the second contact image sensor 752 with respect to the first contact image sensor 751 may be preferred to maintain the accuracy in the measurement.

The configuration with either single-side or double-side CIS units described hereinbefore according to various example embodiments has been found to be easily adaptable to various commercial PBF systems. For example, the configuration enables imaging and inspection of powder bed and/or consolidated layers as well as by-products at each movement of the powder re-coater arm both in systems with one and two powder hoppers. In various example embodiments, the method of monitoring a powder bed process as described hereinbefore may be applicable to, for example, all seven powder bed-based additive manufacturing technologies, namely, selective laser sintering (SLS), selective laser melting (SLM), electron beam melting (EBM), direct metal laser sintering (DMLS), selective heat sintering (SHS), laser metal fusion (LMF) and binder jetting. Indeed, they all rely on the deposition of individual layers of material, which may be imaged using variations of the described technology.

Example: Application of a Method to Characterize Powder Bed Defects (PBDs) Using a Single-Side CIS Unit on a Prototype Platform The causes that lead to the formation of PBDs are manifold. However, their onset can occur as early as in the powder layer deposition process. For instance, non-uniformities in the powder bed layer (which may hereinafter be referred to as PBDs) may alter the sintering/melting process and may result in the formation of flaws in the consolidated builds. To a first approximation, this phenomenon may be mathematically described as:

$$\Delta V_{ED} = \frac{P}{s \cdot \sigma \cdot \Delta t} \quad (1)$$

where $\Delta V_{ED}$ denotes the variation of the volumetric energy density (J/m$^3$), P(w) denotes the power of the high-energy beam, s (m/s) denotes the beam scanning speed, σ (m) denotes the hatch spacing, and Δt(m) denotes the non-uniformity of the powder layer thickness caused by PBDs. The presence of a PBD (and the associated Δt) may thus result into excessive or insufficient energy input, which is known to yield key-hole or lack-of-fusion type of defects, respectively. Some examples of PBDs are partially coated build platforms resulting from insufficient powder feed, super-elevated edges in the powder bed which are introduced by the linear motion of a damaged re-coater blade, or intermittent trenches generated by contaminants (e.g. large clusters of particles, or spattering resulting from previously processed powders) which are dragged across the powder bed.

In this example, a method of monitoring a powder bed process (or corresponding monitoring system) is provided according to various example embodiments, by imaging an entire powder bed layer at the remarkable spatial resolution of about 5.2 μm/pixel and using the image obtained to characterize PBDs in-line. In various example embodiments, the monitoring system includes a CIS unit integrated with a powder re-coater arm of a custom-made PBF prototype. Because image acquisition is synchronized with the re-coating motion, the acquired powder bed micrographs are captured in-line (i.e., concurrently to the powder layer deposition process) and require no further image correction. Due to the narrow DOF of the CIS unit, super-elevated edges, trenches, and variations in the powder bed layer thickness fall out of the focal plane and appear "blurred" in the acquired micrographs. Various example embodiments of the present invention advantageously leverage this feature to automatically detect such PBDs by quantifying focus levels across the entire scan using a modified Laplacian algorithm or technique. Various example embodiments also demonstrate that by calibrating the measured level of focus with the distance of the CIS unit from the build platform, the absolute height or depth of these PBDs can be assessed.

Various experimental results show that the "powder bed scanner" (e.g., corresponding to the "monitoring system" as described hereinbefore) according to various example embodiments provides a time- and cost-effective solution to PBD detection, without trading off spatial resolution against field-of-view (FOV). Because the powder bed scanner is material and technology agnostic, it may be integrated in different PBF systems, including Selective Laser Sintering (SLS), Selective Laser Melting (SLM) and Electron Beam Melting (EBM), as well as binder jetting additive manufacturing systems.

Experimental Setup

Figure 8:
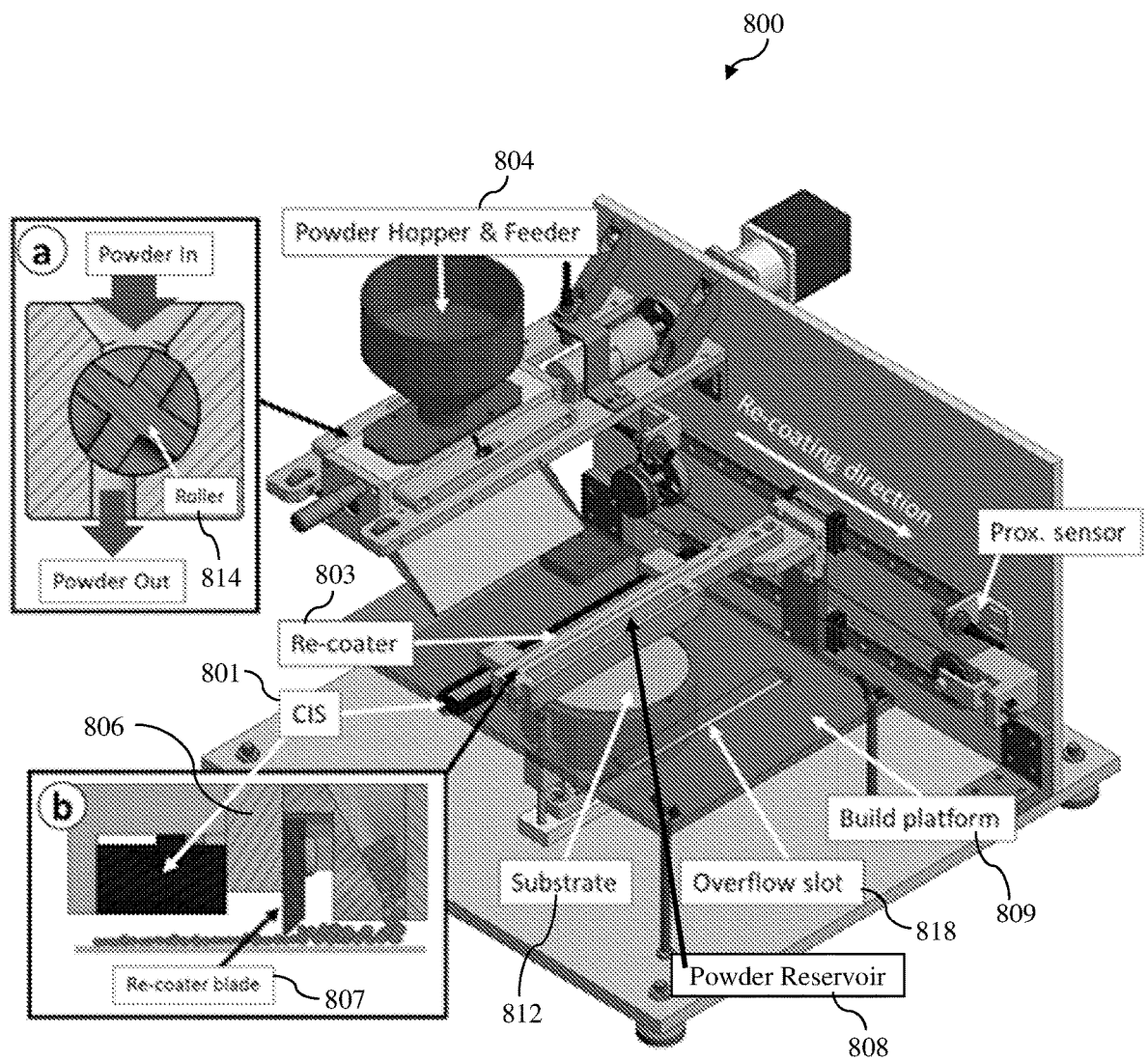
FIG. 8 depicts an experimental setup of an example additive manufacturing system, according to various example embodiments of the present invention.

FIG. 8 depicts a computer aided design of an experimental setup of an example additive manufacturing system 800 including the powder bed scanner (e.g., corresponding to the "monitoring system" as described hereinbefore) according to various example embodiments of the present invention. The inset denoted by (a) in FIG. 8 shows a cross-sectional view of a powder feeder 804 for powder dispensing, and the inset denoted by (b) in FIG. 8 shows a cross-sectional view of the powder re-coater 803 with a CIS unit 801 attached thereto, a powder re-coater arm 806 (comprising a powder re-coater blade 807), and a powder reservoir 808.

In various example embodiments, the additive manufacturing system 800 includes a custom-made powder bed platform 809, a CIS unit 801, and a microcontroller (not shown in FIG. 8) configured to synchronize the powder re-coater motion to the CIS image acquisition rate. In various example embodiments, rather than using a commercial PBF 3D printer, a powder bed system may be developed (custom built) to have higher flexibility over the powder bed scanner design and implementation. For illustration purpose, the powder bed scanner may be used exclusively for powder bed monitoring. In other words, various example embodiments may only focus on pre-melting operations, such as powder dispensing and powder re-coating. No melting or sintering processes are investigated at this stage.

Powder Bed Platform

As illustrated in FIG. 8, according to various example embodiments, the example additive manufacturing system 800 includes four modules (or components): a powder hopper and feeder module 804; a powder re-coater module 803; a CIS unit 801 (e.g., obtained from a flatbed scanner) attached to the powder re-coater arm 806 of the powder re-coater module 803 (see enlarged view denoted by (b) in FIG. 8); and a substrate 812, whose height and tilt angle can be manually adjusted.

The powder hopper and feeder module 804 are designed to store the powder feedstock and to dispense it into the powder re-coater module 803, respectively. The roller 814 in the feeder 804 allows dispensing a precise amount of powder by controlling the number of quarter rotations per feed (see enlarged view denoted by (a) in FIG. 8). The rotating motion may be driven by a 5:1 planetary-geared stepper motor (OMC Stepper 17HS15-16845-PG5) through a detachable shaft coupling. This design may be selected to facilitate the extraction and cleaning of the entire powder feeder module 804, which slides on top of two rails with support bearings. The amount of powder that is dispensed by the roller 814 may be accumulated in a small reservoir in the powder re-coater module 803. From there, the powder falls onto the substrate 812 and is subsequently spread by the powder re-coater arm 806 (comprising a powder re-coater blade 807) during the powder re-coating operation (see enlarged view denoted by (b) in FIG. 8). The powder re-coater 803 may be driven by a second planetary-geared stepper motor through a cable-driven mechanism, which translates the powder re-coater arm 806 parallel to the substrate 812. Excessive powder may be pushed into the overflow container (not shown in FIG. 8) through an open slot 818 placed at the end of the build platform 809.

Powder Bed Scanner Sensor

A key element of the powder bed scanner (monitoring system) is the CIS unit 801, which enables in-line imaging of the powder bed. For example, this type of sensor may be commonly found in a flatbed document scanner. By way of an example only and without limitation, the CIS unit 801 used in the example powder bed scanner was detached from a Canon LiDE 220 flatbed scanner. The CIS unit 801 was secured to the powder re-coater arm 806 using two clamps, which allow adjusting the height and tilt of the CIS unit 801 to bring the powder bed in focus and set the CIS unit 801 parallel to the powder re-coater blade 807, respectively. This consumer-grade model of flatbed scanner is inexpensive, yet it provides an optical resolution of 4800 dots-per-inch (DPI) over a length of 210 mm (which corresponds to the width of an A4 paper). This resolution yields images with pixel size as small as 5.3×5.3 µm. The CIS unit 801 may also be set to acquire images at lower resolution, which reduces the scanning time. In various example embodiments, three different resolutions were used and are summarized in Table 1 below. A detailed analysis of the images acquired using these different settings is provided later below under the section "Image resolution and acquisition time".

TABLE 1

Different image resolution settings used in various example embodiments

| Resolution (DPI) | Pixel size (µm/pixel) | Total number of pixels |
|---|---|---|
| 4800 | 5.3 | 1 × 39685 |
| 1200 | 21.2 | 1 × 9921 |
| 600 | 42.3 | 1 × 4960 |

Figures 9A, 9B:
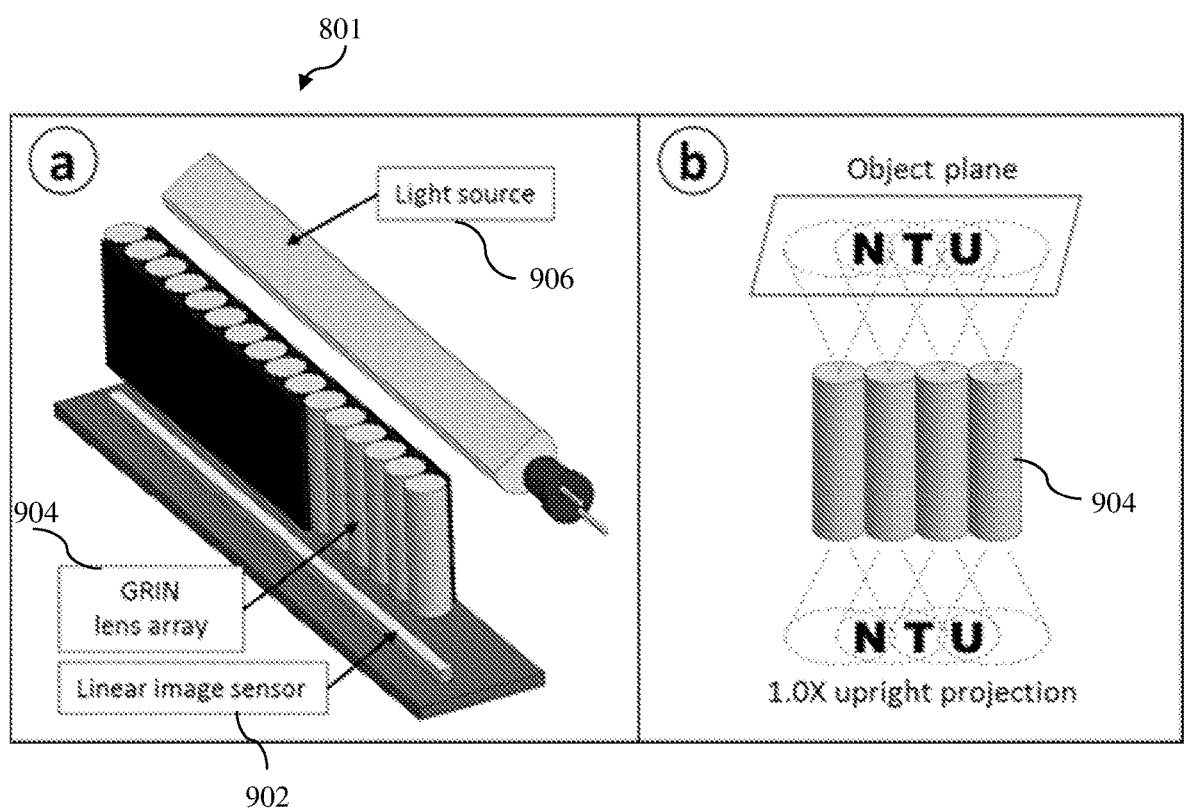
FIG. 9A depicts a schematic drawing of an internal structure of a contact image sensor, according to various embodiments of the present invention.
FIG. 9B illustrates an image projection characteristic of a GRIN lens array of the contact image sensor shown in FIG. 9A.

FIG. 9A depicts a schematic drawing of the CIS unit 801, including three parts or components, namely, a linear image sensor 902, a rod lens array (GRIN lens array) 904, and a diffused light source 906. FIG. 9B schematically illustrates a characteristic of the GRIN lens array 904, which produces an upright, 1:1 projection of an object onto its image plane.

In particular, FIG. 9A depicts a schematic view of an internal structure of the CIS unit 801. The CIS unit 801 integrates three main components: a linear image sensor 902 including a single row of photodetectors, a rod lens array 904, and a diffused light emitting diode 906. The rod lenses in the rod lens array 904 are cylindrical, flat-end gradient-index (GRIN) lenses. This special type of lens acts as an image relay device, projecting an upright image of the object onto the image plane with a 1.0× magnification. When GRIN lenses are arranged into an array, such as in CIS units, the images projected by the individual elements partially overlap with each other, creating a continuous and self-focused image strip along the length of the array (e.g., see FIG. 9B). This image strip may be then digitized by the linear image sensor 902. Due to their character, GRIN lenses introduce no distortion. Moreover, GRIN lenses exhibit short working distance (of the order of a few millimeters) and a DOF of less than 100 µm. As described herein, various embodiments of the present invention utilizes such a narrow DOF to detect and characterize PBDs (e.g., see section "PBDs characterization method") later below.

CIS and Re-Coater Synchronization Scheme

According to various example embodiments, it is noted that using a commercial CIS sensor to image the powder bed as it is deposited presents two main challenges. First, the electrical connections and the communication protocol used to control the CIS may be proprietary. Thus, it may not be possible to directly access the raw image data acquired by the CIS unit. Second, to avoid image distortion, it is noted according to various example embodiments that the powder re-coater arm (where the CIS is attached on) should move at the same speed as the CIS image acquisition rate, which may be defined by the image resolution settings. In this regard, the acquisition rate of the CIS may be denoted as ms/line (millisecond per scan line or pixel strip) and may be determined by the selected image resolution setting (e.g., DPI). By way of an example only and without limitation, an example image resolution of 4800 DPI may result in 5.5 µm/pixel and may thus need 5 ms to acquire the entire pixel strip. Therefore, the acquisition rate for the example image resolution of 4800 DPI may be 5.5 µm/5 ms or 1.1 mm/s. Accordingly, by setting the movement speed of the powder re-coaster arm based on the image acquisition rate of the CIS, the speed of the powder re-coater arm may be configured to match (or substantially match) the acquisition rate. In this regard, it is noted that differences in the moving speed of the powder re-coater arm and the sampling rate of the CIS unit may likely result in either compressed or stretched images along the scanning direction.

To overcome the first challenge, various example embodiments acquire and compile scans using the flatbed scanner's original controller (OC) and software package (Canon ScanGear). An advantage of this solution is that image contrast, brightness, and exposure adjustments are automatically handled by the software. Addressing the second challenge is more complex. It is noted according to various example embodiments that because the stepper motor and the cable-pulley translation mechanism employed to drive the powder re-coater arm may be different than those used to move the CIS unit in the flatbed scanner, using the OC's signal to directly control the re-coater motion may result in asynchronous image acquisition and re-coating rates. To overcome this problem, a controller designed or configured according to various example embodiments is provided, which functions as a signal translator. The controller may be configured to read the control signal received from the OC and generate a new signal that is used to drive the powder re-coater arm motion according to the image resolution settings (e.g., DPI settings). The control signal may be in the form of a square wave, whose frequency and number of pulses depend on the DPI settings and the size of the area to be scanned, respectively. In a flatbed scanner, this control signal determines how fast and how much the CIS moves. For example, at 600 DPI setting, an OC's control signal of 5000 pulses at a frequency of 1400 Hz moves the CIS by 50 mm at a speed of 14 mm/s. The controller may be configured to detect the pulse frequency of the OC control signal and instantly generate a new driving signal (appropriate for the powder re-coater's stepper motor) which moves the powder re-coater arm at a rate that is identical to the CIS image acquisition rate. When the OC stops generating pulses (indicating that scanning operation is complete), the controller retracts the powder re-coater module to the initial position and stays idle for the next scanning operation. As a result, the acquired scans are undistorted and can be promptly analyzed without the need for further image corrections.

Image Resolution and Acquisition Time

FIG. 10A depicts a raw image of a Thorlabs concentric square target acquired using the powder bed scanner according to various example embodiments of the present invention. The squareness of edges in the scan confirms that there is no image distortion. FIG. 10B depicts a raw image of an NBS 1963A resolution target acquired using the powder bed scanner according to various example embodiments of the present invention. At 4800 DPI, the highest achievable resolution is about 13.9 µm (corresponding to 36 line-pairs/mm as shown in the zoomed section).

In particular, to verify the accuracy of the synchronization technique presented in the previous section and to test the scanner spatial resolution, scans of different calibration targets placed on top of the substrate were taken. Before acquiring the images, the substrate height was adjusted to bring the targets surface into focus. FIG. 10A shows the scan of a concentric square target (Thorlabs R3L3S3P) that was used to assess image distortion. Since the number of pixels on the horizontal edges in the image (h) equals that along the vertical edges (v) for every square feature, it is confirmed that there is no image distortion along the scanning direction. These measurements were repeated for different image acquisition settings (i.e., 600 DPI, 1200 DPI, and 4800 DPI) and the same result was found, indicating that the synchronization technique yields distortion-free scans for different image resolution settings.

FIG. 10B shows the scan of an NBS 1963A resolution target (Thorlabs R2L2S1P1), which was used to test the spatial resolution of the powder bed scanner as a function of image DPI. At 4800 DPI (the highest image quality attainable with the CIS unit used in this example), the smallest resolvable features are those in the 36 line-pairs/mm section, which corresponds to a resolution of about 27.8 µm per line-pair or about 13.9 µm per distinguishable feature. However, the physical pixel size in the CIS unit is 5.3 µm, as calculated from the 4800 DPI value. Various example embodiments attribute this discrepancy to the quality of the lens array, which will be discuss in more detail later in section "CIS non-uniformity correction". The spatial resolution at other DPI values as well as the image acquisition time for an area of 210×150 mm (corresponding to the size of the entire build platform) are reported later in Table 2.

Powder Bed Scans and Image Settings

Figure 11:
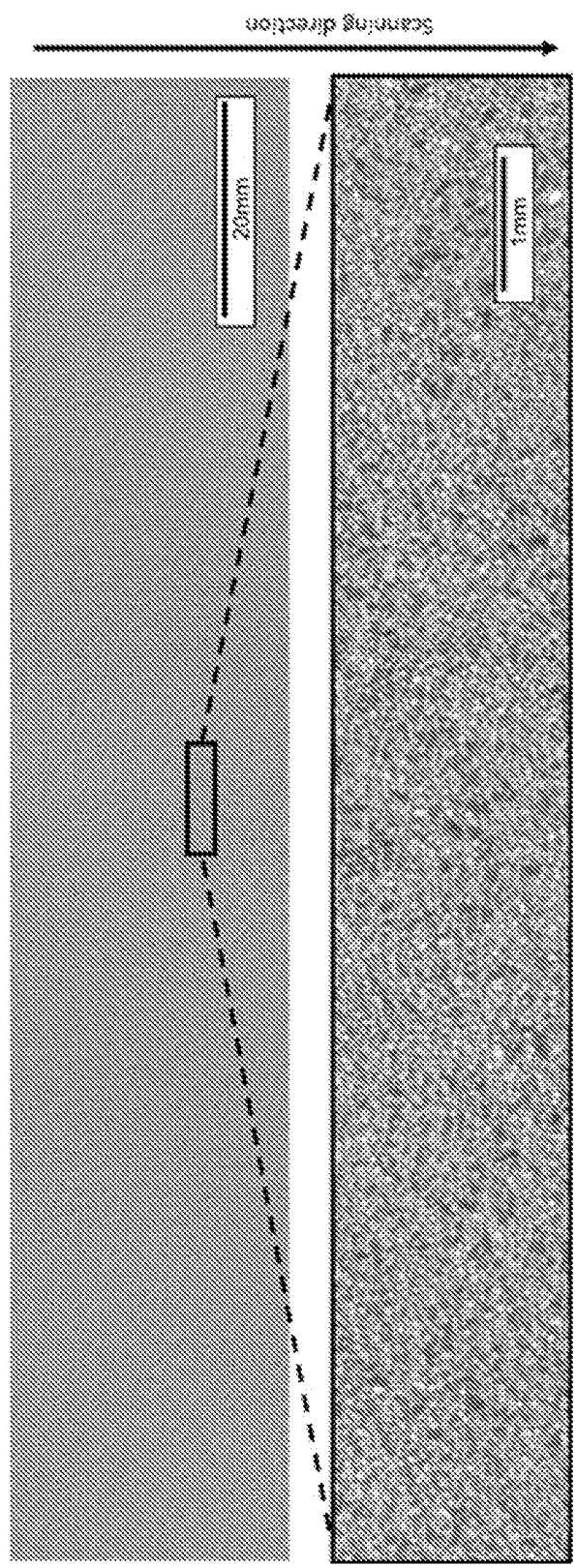
FIG. 11 depicts a section of the powder bed scan acquired during a powder re-coating process at 4800 DPI, according to various example embodiments of the present invention.

FIG. 11 shows a section of the powder bed scan acquired during the re-coating process at 4800 DPI. In particular, FIG. 11 depicts a powder bed scan taken from a uniformly distributed powder layer. The image is acquired at 4800 DPI. In this study, gas-atomized 316L stainless-steel powders with spherical shape and size distribution of 20-53 µm were used. Powders with these specifications are commonly used in laser sintering processes. At 4800 DPI (about 14 µm spatial resolution), individual powder particles across the entire powder bed can be easily resolved as shown in FIG. 11. For example, although the entire powder bed is captured, individual powder particles can be visualized by a digital zoom from the same image. Albeit remarkable, this level of detail may not be required to detect PBDs according to various example embodiments, as will be discussed later in section "Discussion". Therefore, to reduce scanning time, various example embodiments may set the powder bed scanner to acquire images with lower DPI. All the results presented in the following sections rely on scans with 1200 DPI, unless otherwise stated.

TABLE 2

Scanning time and smallest resolvable features at different image acquisition settings.

| Resolution (DPI) | Scanned Area (mm) | Scanning Time (second)* | Resolvable Resolution (µm) | Acquired image size (MB)** |
|---|---|---|---|---|
| 600 | 210 × 150 | 7 | ~70 | ~17 |
| 1200 | 210 × 150 | 22 | ~45 | ~68 |
| 4800 | 210 × 150 | 315 | ~14 | ~1024 |

*includes the returning time when scanning is finished
**images acquired in TIF format without compression PBDs Characterization Method There are many image analysis techniques that may be employed to detect PBDs from photographs of the powder bed. For instance, Craeghs et al. ("Online Quality Control of Selective Laser Melting", in *Proceedings of the Solid Freeform Fabrication Symposium*, 2011, pp. 212-226) analyzed the intensity levels across the image and identified PBDs as regions in the photograph with grey value larger than a pre-defined threshold. Other techniques may use a fringe projection system, which includes a projector and a single camera, or multiple cameras that capture the projected fringe pattern on the powder surface to infer the powder bed topography.

According to various example embodiments, a method to both detect and quantify the severity of PBDs (i.e., the $\Delta t$ associated with PBDs) based on the image focus level is provided. In particular, by utilizing the narrow DOF of CIS units, surface features that fall above or below the focal plane appear out-of-focus (or "blurred") in the scans. This characteristic is a limitation of CIS-type flatbed scanners and makes them only suitable to image surfaces without significant topography (e.g., paper documents). However, according to various example embodiments, against conventional teachings, such a limitation (the narrow DOF) was advantageously utilized and becomes an important asset. In this regard, various example embodiments detect PBDs by mapping the out-of-focus areas in the powder bed scan. Moreover, by quantifying the focus level in these areas, various example embodiments assess the distance of PBDs from the focal plane. In other words, the "degree of blurriness" of different PBDs provides information about the magnitude of variation in powder bed thickness, $|\Delta t|$. A method or algorithms used to quantify the level of focus in the scans are described in the following section "Quantification of image focus level", according to various example embodiments of the present invention.

Figure 12:
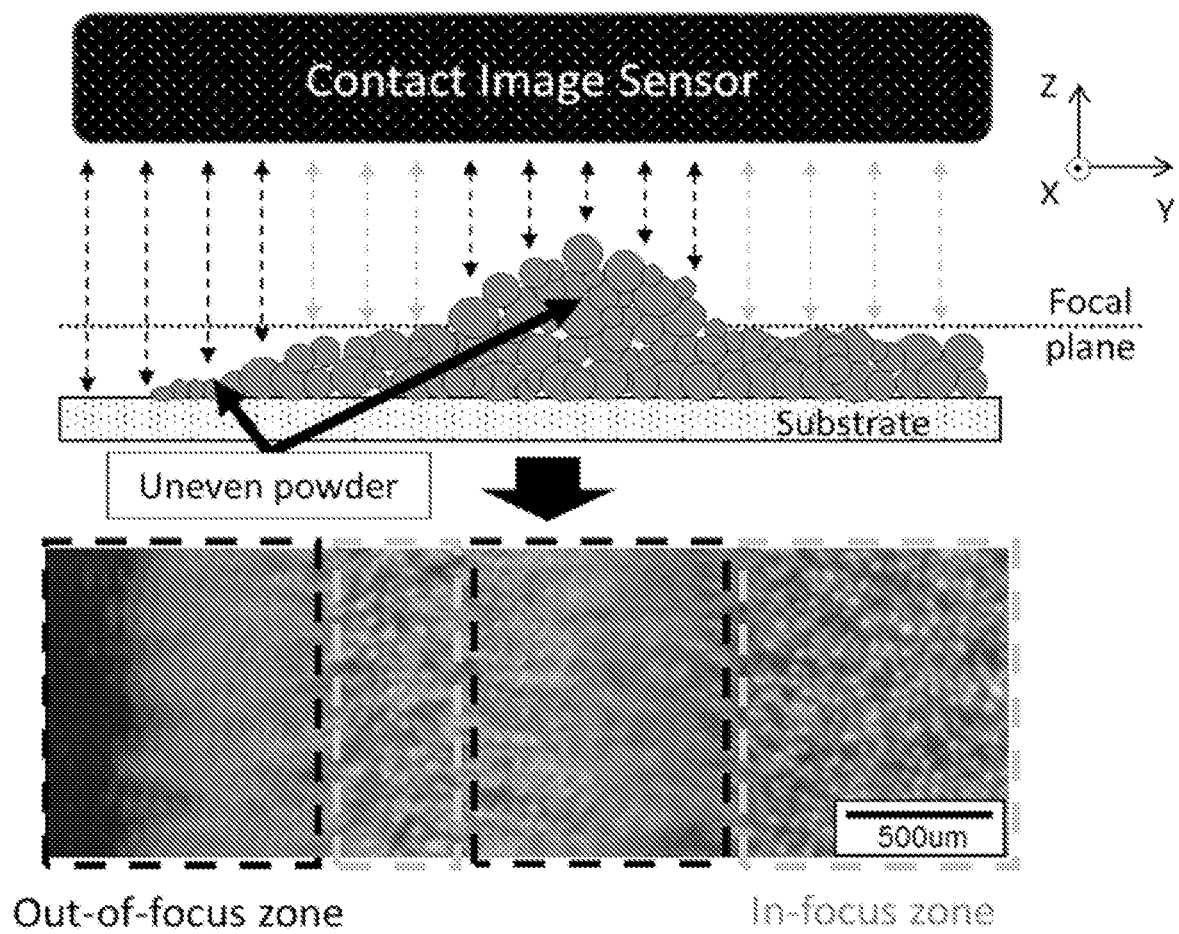
FIG. 12 depicts a schematic cross-sectional view of a defective powder bed layer and its corresponding top-view scan, according to various example embodiments of the present invention.

As an example illustration, FIG. 12 depicts a schematic cross-sectional view of a defective powder bed layer and its corresponding top-view scan. In particular, FIG. 12 combines a schematic of a cross-section view and an actual scan of a defective powder bed. In this regard, by utilizing the narrow DOF of the CIS unit according to various example embodiments, portions of the powder bed that are farther or closer than the set focal distance appear out-of-focus in the scan. In particular, PBDs that are farther (e.g. depressions) or closer (e.g. protuberances) to the CIS sensor than the set focal distance appear out-of-focus in the resulting scan. The farther (or closer) they are, the blurrier the corresponding area in the scan. In the example, the scan was taken at 4800 DPI for easy visualization of powder particles.

Quantification of Image Focus Level

An image may be assumed to be in focus if it is rich in textures and if these textures exhibit clear, sharp "edges", namely, abrupt transitions in intensity level between adjacent pixels. According to various example embodiments, the focus level of an image may be determined by evaluating the density of edges that it contains. This operation can be accomplished using a focus measure operator (FMO). Different types of FMOs may yield similar results but use different working principles. A comprehensive review of FMOs can be found in Pertuz et al., "Analysis of focus measure operators for shape-from-focus", *Pattern Recognit.*, vol. 46, no. 5, pp 1415-1432, 2013, the content of which being hereby incorporated by reference in its entirety for all purposes. Different FMOs were evaluated according to various example embodiments and the modified Laplacian-based focus measure operator (ML-FMO), such as described in Nayar et al., "Shape from Focus", *IEEE Trans.*, vol. 16, no. 8, pp. 824-831, 1994, the content of which being hereby incorporated by reference in its entirety for all purposes, is selected according to various example embodiments, due to, for example, its accuracy in PBD detection and the low computational cost. The ML-FMO may be defined as:

$$\Delta_L I = |I * L_X| + |I * L_Y| \quad (2)$$

where I denotes the input image of size (m, n) acquired by the CIS unit. $L_X$ and $L_Y$ denote 1D convolution kernels (called Laplacian kernels) which are applied along the image rows and columns, respectively:

$$L_X = [-1 \ -1 \ 4 \ -1 \ -1]$$

$$L_Y^T = L_X^T$$

The sum of the absolute values from the two convolution operations yields a focus level map, $\Delta_L I$. Each element in the map, $(\Delta_L I)_{i,j}$ (with i=1, 2, ..., m and j=1, 2, ..., n), may assume a value that is proportional to the number of edges found around the original pixel $I_{i,j}$ in the raw image.

Figure 13:
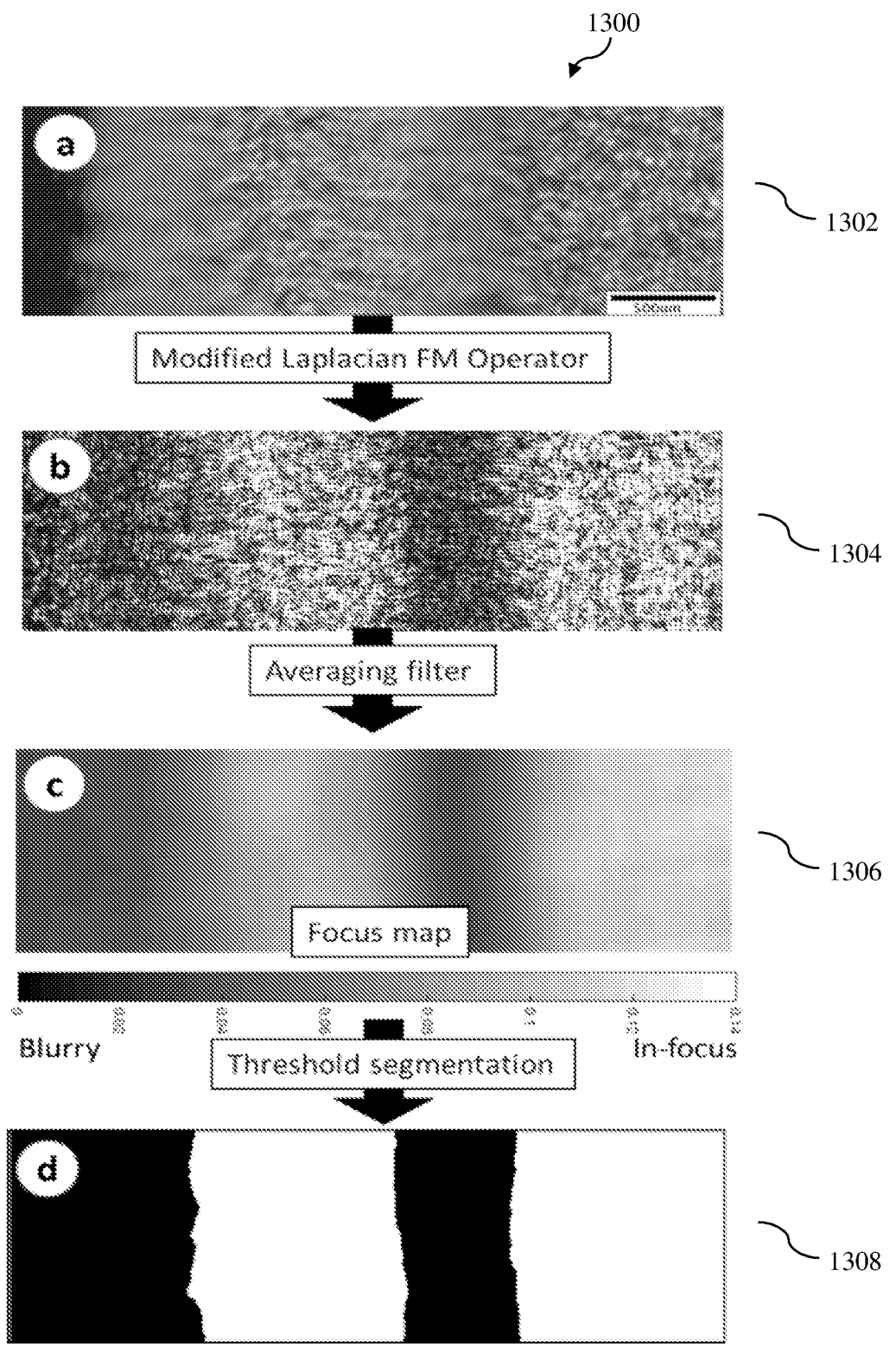
FIG. 13 depicts a flow diagram of an example method of monitoring a powder bed process, according to various example embodiments of the present invention.

FIG. 13 depicts a flow diagram of a method 1300 of monitoring a powder bed process according to various example embodiments of the present invention, including detecting non-uniformities in the powder bed layer based on the focus level property of an image of the powder bed layer scanned by the CIS unit. As shown in FIG. 13, at 1302, the scanned image of the powder bed layer was obtained. At 1304, a focus level map ($\Delta_L I$ map) was obtained from the scanned image. In this example, the focus level map was obtained using a modified-Laplacian focus measure operator. At 1306, a corresponding $F_B$ map (e.g., corresponding to the "smoothened focus level map" as described hereinbefore) was obtained after applying a box filter with kernel of 81×81. In-focus and out-of-focus areas are shaded lighter and darker, respectively. At 1308, PBD identification (shown in black) is performed using a threshold of 40% with respect to the maximum focus value in the scan (0.14).

According to various example embodiments, the powder bed scans acquired by the CIS unit may be ideal images to be processed using the ML-FMO because they have high density of "edges" (i.e., the powder particle contours) and because of the narrow DOF of the CIS unit (e.g., see 1302 in FIG. 13). However, various example embodiments identified that due to the high resolution of the input image, the output $\Delta_L I$ maps result may be "noisy" (e.g., see 1302 and 1304 in FIG. 13). Accordingly, in various example embodiments, a box filter may be applied to smoothen the focus level map ($\Delta_L I$):

$$F_B = \Delta_L I * M_k \quad (3)$$

In Equation (3), $M_k$ denotes a k-order square matrix with elements, $$M_{k_{i,j}} = 1/k^2,$$

and k denotes a scalar which defines the size of the window used to perform the smoothening operation. In various example embodiments, the value of k may depend on the input image DPI. For instance, it was determined that 21×21 and 81×81 $M_k$ matrices work best for 1200 DPI and 4800 DPI input images, respectively. FIG. 13, at 1306, shows the final focus map, $F_B$, (e.g., corresponding to the "smoothened focus level map" as described hereinbefore according to various embodiments) after smoothening. For example, the higher the focus level value, the more in-focus the region in the image. To detect PBDs, accordingly to various example embodiments, a threshold value (e.g., corresponding to the "threshold condition" as described hereinbefore according to various embodiments) may be applied to the focus map. For instance, FIG. 13, at 1308, shows a PBD map after setting a threshold of 40% with respect to the maximum focus value in the scan.

According to various example embodiments, using 1200 DPI images, the powder bed layer deposition and scanning process took 22 seconds (see Table 2), while the subsequent image processing using the ML-FMO took only 2 seconds (using an HP Z420 workstation computer).

Partial Distance Mapping

Using the method of monitoring a powder bed process according to various example embodiments, PBDs can be automatically detected over the entire powder bed concurrently with the powder re-coating process in less than 30 seconds. In various example embodiments, the powder bed scanner (e.g., corresponding to the "monitoring system" as described hereinbefore according to various embodiments) provides an additional capability of measuring (or determining) the severity (or degree) of such PBDs, for example, how deep or high they are with respect to the powder bed surface. Since the powder bed surface is set to coincide with the CIS focal plane, the farther a PBD is from the powder bed surface, the "blurrier" it will appear in $F_B$. To find the function that relates focus level values to PBD distance from the CIS along the z-axis, that is, $D_z = f(F_B)$, experiments as illustrated in FIGS. 14A to 14D were performed according to various example embodiments of the present invention.

FIG. 14A depicts an illustration of the calibration experiment performed to translate (e.g., quantify) focus level values into distances from the CIS unit. FIG. 14B depicts a gradient map of focus level values from a uniform powder bed scan (acquired at 1200 DPI using a kernel size of 21×21)

after tilting the substrate along the scanning direction. FIG. 14C depicts a focus level profile obtained by averaging the gradient map shown in FIG. 14B along the x-axis. The shaded area indicates the uncertainty in the focus measure value. FIG. 14D depicts the fitting of a focus level profile using the inverse of a Gaussian function.

Various example embodiments deposit a PBD-free powder layer, remove the powder re-coating blade, tilt the build platform to a controlled angle α, and acquire a focus map $F_B$, as shown in FIG. 14A. By tilting the build platform, one side of the powder bed results closer to the CIS (and thus under-focus) while the opposite side results farther from it (and thus over-focus). FIG. 14B shows the $F_B$ scan of such tilted powder bed. Only a short segment of the scan is in focus as shown in FIG. 14B. Because the powder re-coater arm is not physically connected to the build platform, it travels on the plane defined by α=0° during the entire translation along the y-axis (e.g., see FIG. 14A). Therefore, the gradient in focus level values shown in FIG. 14B exclusively depends on the tilt angle α (since the powder bed is PBD-free). Various example embodiments take the x-mean of the acquired $F_B$ map (namely, the mean along the direction perpendicular to the scanning direction) and plot it versus y. Various example embodiments use the x-mean of the focus level to limit uncertainties that may arise from an unwanted tilt along the scan width as well as those due to CIS non-uniformities (e.g., as will be discussed in the following section "CIS non-uniformity correction"). The resulting $F_B$-curve is shown in FIG. 14C. The shaded areas around $F_B$-curve correspond to the measurement error, which was calculated by taking the standard deviation of each point along the $F_B$-curve. Various example embodiments compile five $F_B$-curves from different areas of the scan and found that the error is, on average, ±30 μm. Since the measurement error is smaller than the typical powder particle size (about 50 μm on average), it can be concluded that the distance between the powder bed layer and the CIS unit can be calculated with accuracy. Various example embodiments also calculate the measurement error at the image resolution of 4800 DPI and found no significant difference (not shown). This result is not surprising given that distance values are calculated from focus level values, which depend on how many "edges" (namely powder particle contours) can be found in the image (e.g., see the previous section "Quantification of image focus level"). Since individual particles can be resolved at both 1200 DPI and 4800 DPI, the resolution and accuracy of our distance measurements do not depend on image resolution.

The $F_B$-curve exhibits one peak, which corresponds to the portion of the $F_B$ scan that is in perfect focus. Moreover, the $F_B$-curve is symmetric about the peak-centre. In other words, both under-focus and over-focus portions of the $F_B$-curve assume similar focus values. This result implies that the scanner cannot distinguish between depressions and protuberances in the powder bed. It only returns the estimated absolute value of their distances to the CIS unit, $D_z$. To derive the function $D_z = f(F_B)$, various example embodiments fit the over-focus portion of the $F_B$-curve to the real distance values between CIS unit and powder bed surface, d, which was computed as:

$$d = d_0 + y \tan\alpha \quad (4)$$

In Equation (4), $d_0$=2.6 mm is the distance set according to various example embodiments the under-focus portion of the powder bed surface to (i.e., the distance of the powder bed to the CIS unit at the beginning of the scan) and α=1.3°. These values are set precisely by using the height-controllable substrate in the powder bed system (additive manufacturing system) 800 according to various example embodiments (see FIG. 8). Values of y may range from 0 to m*pixel size, where pixel size refers to the size, in μm, of a pixel in the scan.

According to various example embodiments, it is noted that the $F_B$-curve in FIG. 14C resembles a Gaussian function that is centred at the focus value. Accordingly, it may be established that the relationship between the focus measure value computed via the ML-FMO and the focus distance may be described by a Gaussian-like function. Thus, various example embodiments fit the focus level measurements, $F_B$, using the inverse of a Gaussian function to estimate the corresponding distance values, $D_z$:

$$D_z = f(F_B) = a + b * \sqrt{2\ln\frac{c}{F_B}} \quad (5)$$

In Equation (5), a=0.072, b=1.17, and c=10 are fitting parameters obtained from the fitting of the over-focus portion of the $F_B$-curve. In various example embodiments, the maximum value was limited to $D_z$ to 0.5 mm since at greater distance the calculated $D_z$ values diverge from the real data and thus may become unreliable. A range of 500 μm, however, corresponds to several times the typical powder bed layer thickness, t, and thus is perfectly appropriate to assess PBDs, whose height (or depth) is only a fraction of t. An example of the inversed Gaussian distance fitting function is shown in FIG. 14D. Since $F_B$ depends on image acquisition settings (such as DPI) according to various example embodiments, image post-processing (e.g., the kernel used in the box filter), and reflectivity of the powder used, the calibration described in this section may be repeated each time any of such parameters is changed.

CIS Non-Uniformity Correction

Figure 15:
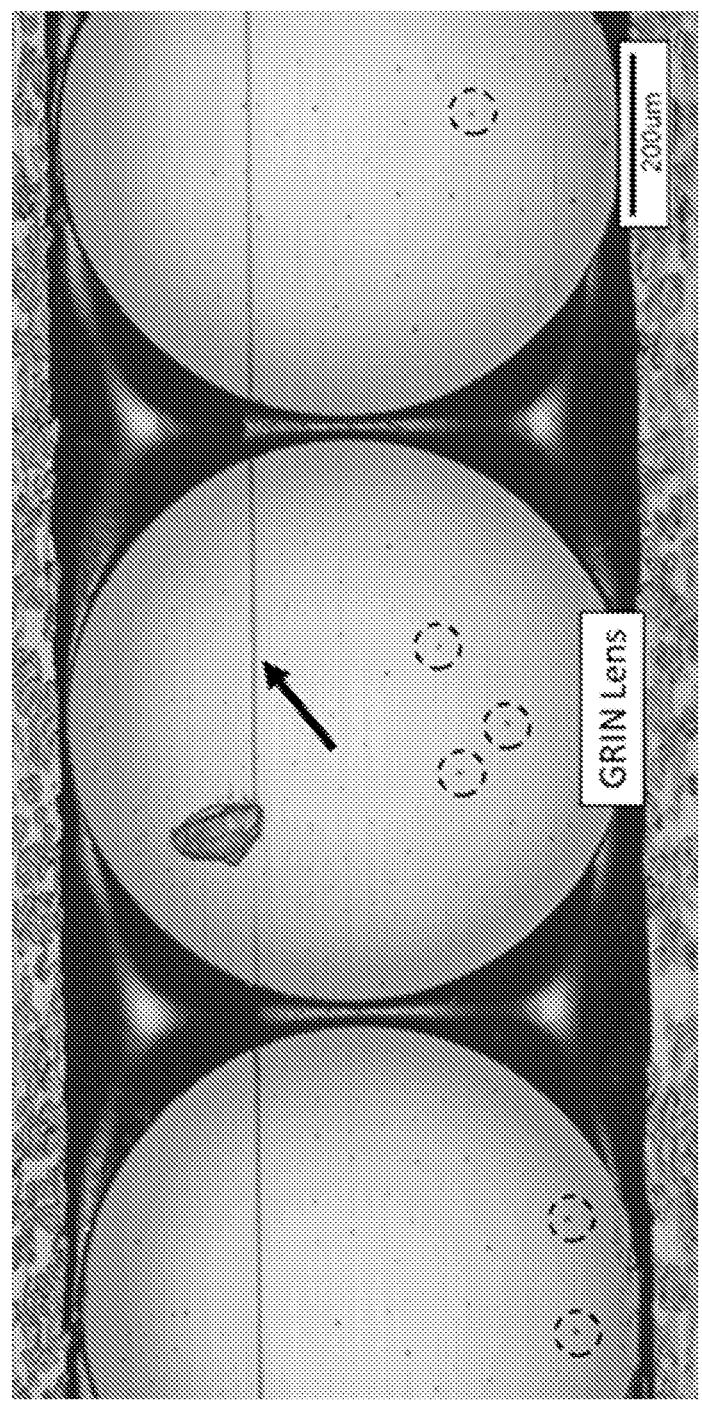
FIG. 15 depicts an optical micrograph obtained from a surface of a GRIN lens array with example defects thereon, according to various example embodiments of the present invention.

Because the CIS unit employed in the powder bed scanner according to various example embodiments may be taken from a consumer-grade, inexpensive flatbed scanner, the quality of the acquired scans may not be perfect. Careful examination of FIG. 11, for instance, may reveal the presence of "columns" along the y-axis that are slightly out-of-focus, although the powder bed is PBD-free. These artifacts, which were also recorded when imaging different objects beside powder particles (not shown here), stem from manufacturing defects introduced in the GRIN lenses and are inherent in the CIS unit. FIG. 15 depicts defects on the GRIN lens array causing non-uniformities in focus level at certain locations across the CIS unit. In particular, FIG. 15 shows an optical micrograph obtained from the surface of the CIS unit used according to various example embodiments. There is a multitude of defects that can be seen in this micrograph, from scratches that extend multiple GRIN lenses, to pores and inclusions.

Regions of the powder bed that are imaged by the defective GRIN lens portions result out-of-focus and thus are erroneously interpreted as PBDs. To overcome this challenge, various example embodiments acquire scans from a PBD-free powder bed (e.g., corresponding to the "reference powder bed layer" described hereinbefore according to various embodiments) and compile a "background" $D_z$ map (e.g., corresponding to the "reference topography map" described hereinbefore according to various embodiments), $D_z^B$, which only contains the spurious PBDs. Various example embodiments use DB map to correct all subsequent $D_z$ maps and eliminate all spurious PBDs.

Figure 16A:
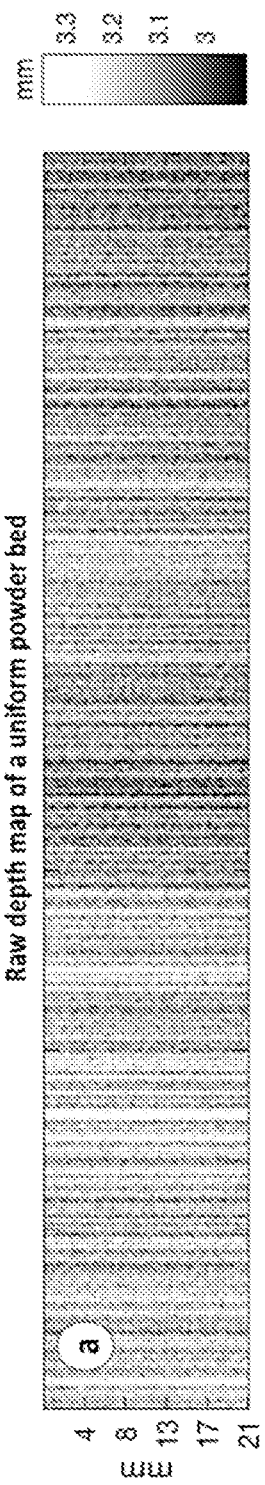
FIGS. 16A to 16C depict an example method of sensor non-uniformity correction, according to various example embodiments of the present invention.
Figure 16B:
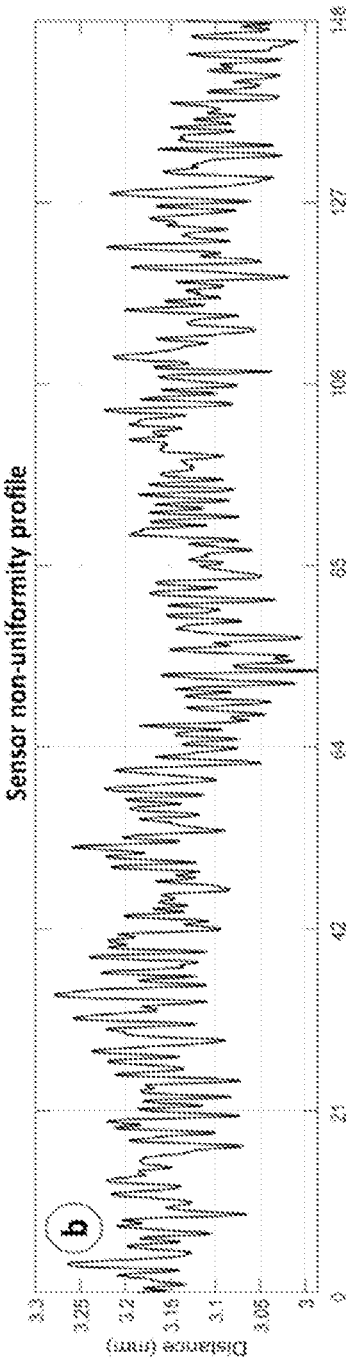
Figure 16C:
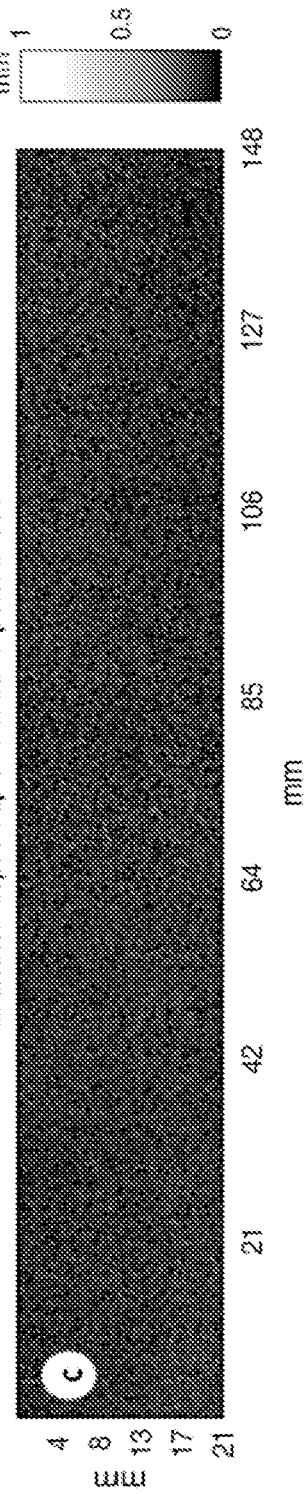

The process is illustrated in FIGS. 16A to 16C according to various example embodiments of the present invention, which depict sensor non-uniformity correction for $D_z$ maps. FIG. 16A depicts a raw $D_z$ map obtained from averaging three scans of a uniform powder bed. The stripes on the map are caused by defects on the GRIN lens array. FIG. 16B depicts the sensor non-uniformity profile obtained by averaging the $D_z$ map in FIG. 16A along the scanning direction. FIG. 16C depicts the resulting $D_z^C$ map after background subtraction. In particular, FIG. 16A shows a $D_z^B$ map obtained from a PBD-free powder bed. Notably, even though PBD-free, the method or algorithm detects a multitude of spurious PBDs that stem from the GRIN lens defects. Because the number and distribution of defects in GRIN lenses stay constant during the scanning sequence (unless the CIS unit is shifted throughout the powder re-coating operation), the x-coordinate of all spurious PBDs in the $D_z^B$ map is invariant across the scan. Thus, various example embodiments take the y-mean of the $D_z^B$ map (namely, the mean along the scanning direction) and compute $D_z^B$-curves such as the one shown in FIG. 16B. By subtracting the DB-curve (line by line) from all subsequent $D_z$ maps, various example embodiments advantageously produce a "corrected" powder bed map, $D_z^C$ as Shown in FIG. 16C. Similar to the Case of $D_z$ Maps, $D_z^B$-curves may be recalculated each time powder material, CIS sensor, or image settings are changed.

PBD Characterization During PBF Processes

Figures 17A, 17B:
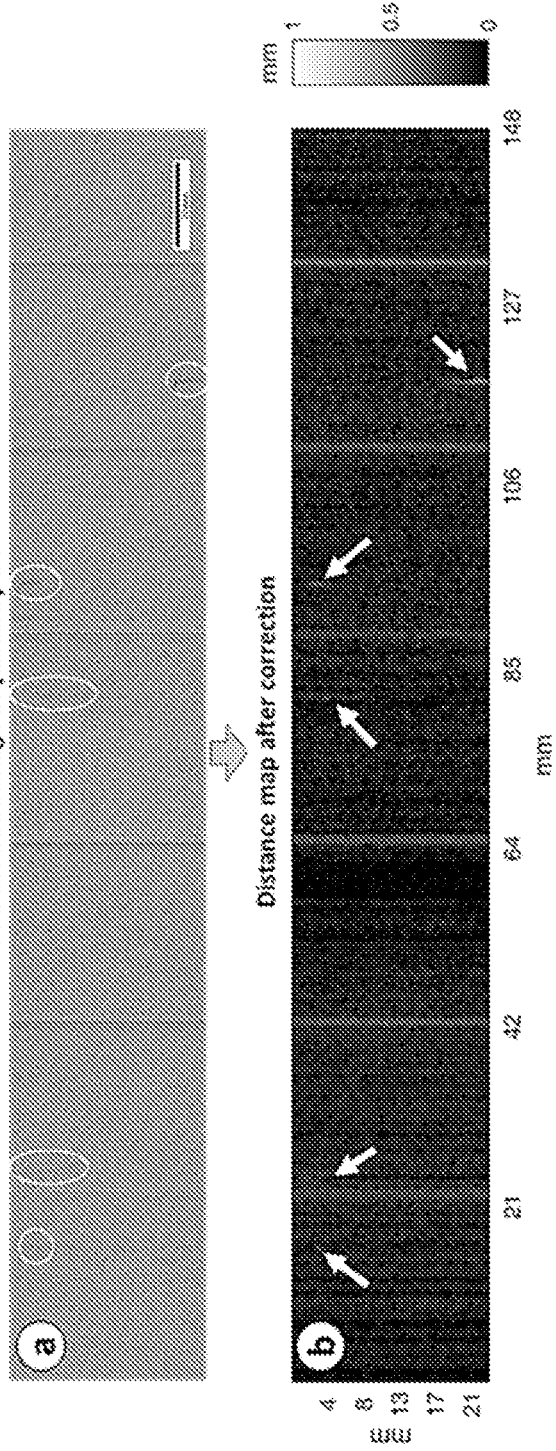
FIG. 17A depicts a raw scan from an example defective powder bed, according to various example embodiments of the present invention.
FIG. 17B depicts a distance map of the example defective powder bed shown in FIG. 17A after correction, according to various example embodiments of the present invention.

To test the powder bed scanner according to various example embodiments in a real case scenario, various example embodiments reproduce PBDs in the additive manufacturing system by mounting a damaged powder re-coater blade taken from an SLM500 3D printer (SLM Solutions). In this experiment, the gap between the powder re-coater blade and the substrate was set to be about 100 μm and the distance between the CIS and the edge of the re-coater blade was adjusted to be about 3 mm, which corresponds to the exact focus distance (e.g., see FIG. 14C). The resulting powder bed scan is shown in FIG. 17A. FIG. 17A depicts a raw scan from a defective powder bed and FIG. 17B depicts its corresponding offset $D_z^C$ map. There are six "continuous" PBDs, which span along the scan length, and a few "intermittent" others, which are circled in FIG. 17A. Continuous PBDs stem from tears and scratches on the powder re-coater blade (see FIG. 17A). This damage is usually induced by super-elevated features on the surface of the additive manufacturing parts, which progressively remove material from the blade during the re-coating operation. Intermittent PBDs may be caused by clusters of particles that are dragged by the blade for some distance and then dropped. To produce a more accurate or more reliable $D_z^C$ map of such a powder bed with no spurious PBDs, the process as described in the previous section "CIS non-uniformity correction" was followed. Because the $D_z^B$ should be PBD-free, however, the damaged blade was exchanged with one in mint conditions and the background scan was acquired. Since different blades were used to acquire the $D_z$ map (from the defective powder bed) and the $D_z^B$ map (from the PBD-free powder bed), the two scans may have a slight difference in focus. Even though the powder bed was re-focused after the blade exchange, it may not be possible to ensure that the distance between powder bed surface and the CIS unit stays exactly the same. This difference in focus (or in distance) shifts the distance values in the $D_z^C$ map by a constant, $d_{offset}$. To correct for this error, various example embodiments computed $d_{offset}$ and subtracted it from $D_z^C$. $d_{offset}$ is calculated as the average among the minima of each row in the $D_z$ map:

$$d_{offset} = \frac{\sum_{i=1}^{m} \min_{j \to n} d_{ij}}{m} \quad (6)$$

In Equation (6), m, n, and $d_{ij}$ denote the number of rows, number of columns, and distance values, respectively, at the (i, j) pixel in the distance map $D_z^C$. The new offset $D_z^C$ map is shown in FIG. 17B.

Figure 18B:
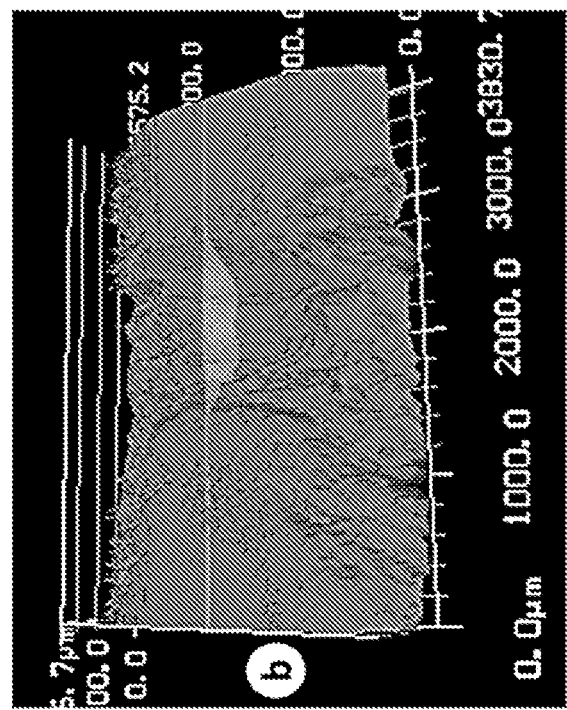
FIGS. 18A to 18C illustrate a laser confocal microscope measurement of damages on a powder re-coater blade, according to various example embodiments of the present invention.
Figure 18A:
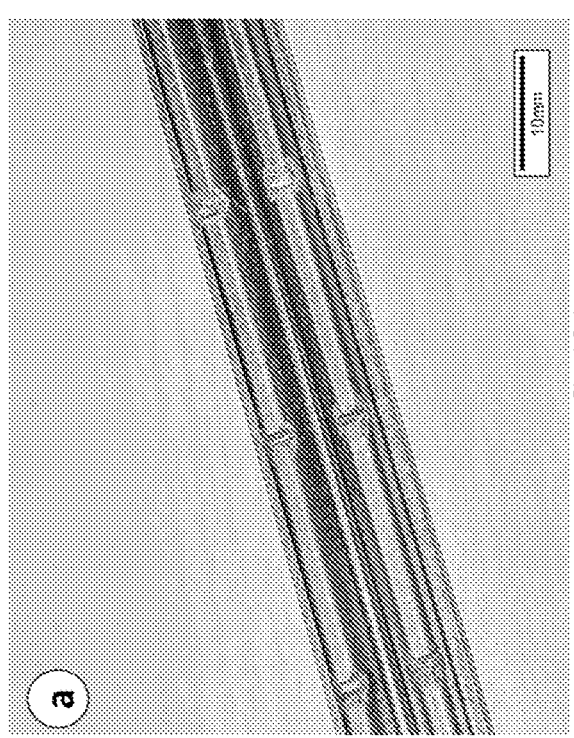
Figure 18C:
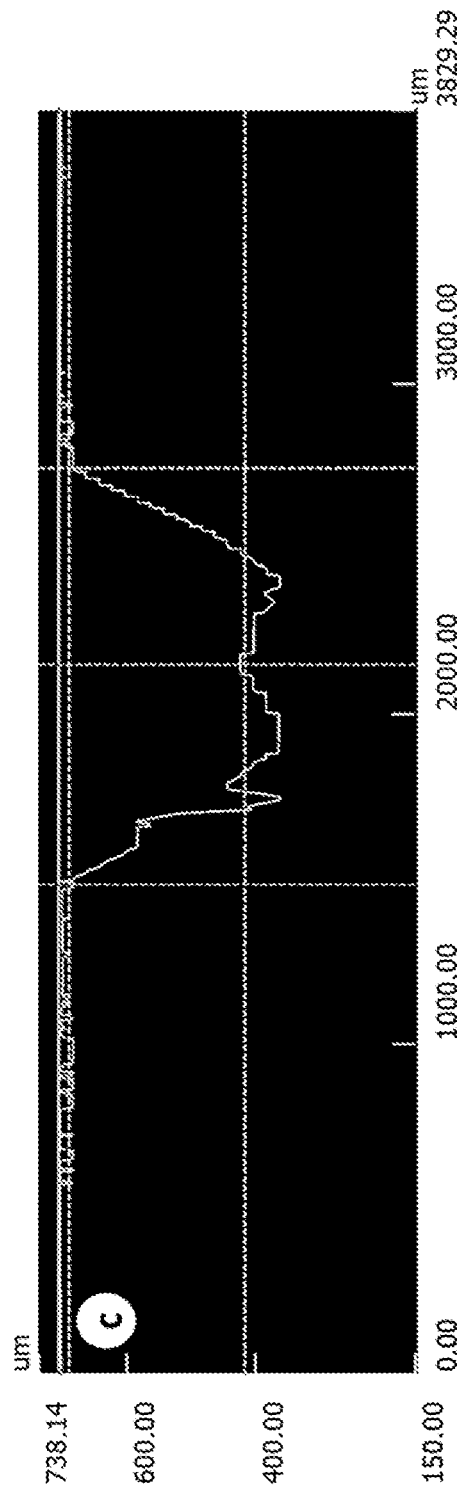

FIGS. 18A to 18C illustrate a laser confocal microscope measurement of the damages on the powder re-coater blade, according to various example embodiments of the present invention. FIG. 18A depicts an optical micrograph of the damaged powder re-coater blade. FIG. 18B depicts a 3D topography of a representative damage in the blade. FIG. 18C depicts the line profile of the damage in FIG. 18B, which indicates a maximum depth of 260 μm. The PBD resulting from this damage is expected to be a stripe with a similar height (within a certain tolerance).

Figure 19:
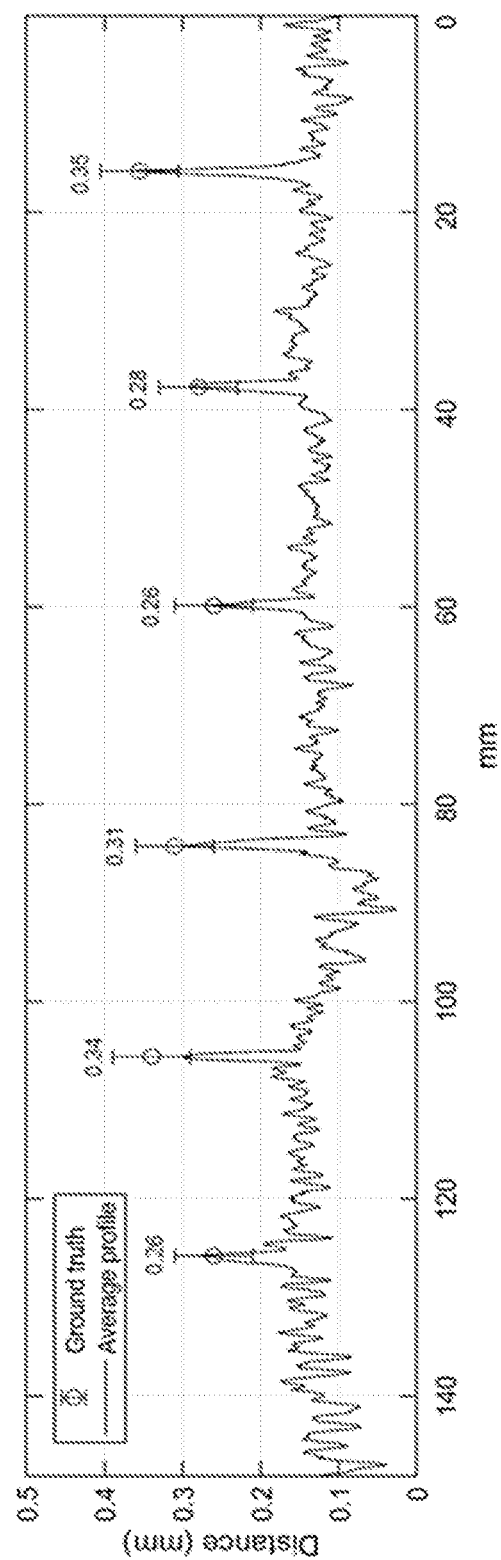
FIG. 19 illustrates a validation of a PBD characterization method, according to various example embodiments of the present invention.

To validate the measurements of PBD distance to the CIS unit (corresponding to their height or depth), various example embodiments characterize the surface topography of the damaged blade by means of laser confocal microscopy. The damaged areas on the blade surface were located from the 3D laser confocal scans (FIG. 18B) and their depth profiles were measured (FIG. 18C). The absolute value of the depth of these defects was compared with the measurements in the offset $D_zC$ map and found good agreement. These results are plotted in FIG. 19, which depicts a validation of the PBD characterization method. The line profile shows the y-mean offset $D_z^C$-profile versus x. The markers (circles) represent depth values of the damages in the re-coater blade measured by laser confocal microscopy. The error-bars on these markers extend ±50 μm about the measured depth value. The line profile in the graph shows the y-mean value of the offset $D_z^C$ map versus x, while the open circle data points correspond to the depth absolute values of each damage in the blade measured by laser confocal microscopy. Because powder particles flow under the action of the powder re-coater blade (as a result of gravity and friction) it may be unrealistic to expect a perfect match between these two sets of measurements. To account for that, a measurement error of one powder particle size was estimated (±50 μm), which was included as error-bars in FIG. 19.

Discussion

Powder bed scanning, which involves integrating a CIS unit within a powder re-coating system according to various example embodiments of the present invention, is an effective technique for in-line characterization of PBDs in PBF processes. For example, the powder bed scanning enables rapid inspection of powder layers at high spatial resolution without sacrificing FOV. Using the CIS unit of a consumer-grade flatbed scanner, various example embodiments of the present invention demonstrated that it is possible to resolve individual powder particles across the entire powder bed area (e.g., 210×150 mm), concurrently to the re-coating operation. By synchronizing (e.g., matching) the image acquisition rate and powder re-coating speed, various example embodiments capture distortion-free scans that require no further image correction in only 22 seconds. For example, this capability may be applicable for in situ monitoring of particle shape and size distribution; especially after the powder feedstock has been recycled multiple times.

In various example embodiments, to detect PBDs, the narrow DOF of the CIS unit was utilized. In various example embodiments, variations in the powder bed layer thickness, $\Delta t$, due to super-elevated edges, trenches, or slopes, fall out-of-focus and can be identified using a Laplacian-based focus measure operator. Not only does such a process provides rapid PBD-detection, it also allows assessing the absolute value of their distance from the nominal powder bed surface, $D_z^C$. It is noteworthy that $D_z^C$ provides a direct measure over the magnitude of $\Delta t$. In other words, it allows quantifying the degree of non-uniformities (e.g., severity of PBDs). As such, $D_z^C$ provides a means to estimate the magnitude of $\Delta V_{ED}$, which determines the formation of defects during the PBF process (e.g., see Equation (1)). For example, this capability is not available in any of the 3D printers on the market. Being able to rapidly determine the severity of PBDs during PBF processes has far-reaching implications or a variety of applications. For example, according to various example embodiments, information of the severity of PBDs may be used as a feedback signal to the PBF printer controller. This information may then enable in-line PBD-correction, for example, by automatically adjusting the power of the high-energy source according to the magnitude of $\Delta t$ (e.g., based on Equation (1)). To this end, however, knowledge of the sign of $\Delta t$ would be also required. For example, the power should be decreased in the presence of depressions in the powder bed thickness ($-\Delta t$). Conversely, it should be increased in correspondence of protuberances ($+\Delta t$). In various example embodiments, to assess the sign of $\Delta t$, a light source may be added in the CIS unit to illuminate the powder bed from an angle. In this manner, analysis of the shadow casted by different PBDs may reveal whether the defects are above or below the powder bed level (and thus the sign of $\Delta t$).

Analysis of the morphology of PBDs may also help characterize their nature. Continuous PBDs (which extend across the entire powder bed) may suggest a damaged powder re-coater blade, similarly to the case depicted in FIG. 17A. Being able to obtain this information during the manufacturing process may advantageously avoid wasting the entire build, saving materials and costs. Conversely, detecting intermittent PBDs that stem from the presence of extraneous particles or contaminants in the powder bed, may be used to trigger a sequence of powder re-coating steps to be repeated until the particles are removed.

Using more sophisticated scanners may open the path to even more detailed powder bed analysis. For example, custom-designed CIS units with defect-free GRIN lenses may require no background correction step and thus may simplify the scanning operation. Moreover, different types of GRIN lenses with configurable focus distance and DOF may be selected to suit different applications. For instance, a longer focal length would provide larger DOF, which is suitable for powder bed monitoring applications that require uniform focus across the build platform and neglect minor PBDs. For example, Table 2 presented hereinbefore shows that the scanning time increases dramatically at high DPI values. This is due to the large size of the captured images (approximately 1 GB for a 210 mm×150 mm scan) which may be transferred to the computer through normal USB 2.0. For example, high-end scanners that possess ultra-fast transfer speed via USB 3.1 would help increase the scanning speed without compromising on resolution.

According to various example embodiments, besides PBDs, powder bed scanners may also be used to collect information from the consolidated material. For example, according to various example embodiments, by redesigning the CIS unit to withstand the high temperature reached by the deposits (for instance using high temperature materials), the powder bed scanner may be employed to monitor both the powder bed (as the powder re-coater moves forward) and the selectively consolidated parts (as the re-coater moves backward after the melting process). This sequence of operations may also maximize the efficiency of the powder bed scanner. For example, the acquired $D_z$ scans of the consolidated parts may be used to analyze the topography of the layers in search of defects, or to assess macroscopic distortions of the build as a result of thermal stresses.

Being simple and low-cost, the powder bed scanner (e.g., corresponding to the "monitoring system" as described hereinbefore according to various embodiments) may be easily integrated in existing (e.g., commercially available) PBF 3D printers with minimal modification of the hardware and control system. However, it will be appreciated by a person skilled in the art that the powder bed scanner may also be used as a stand-alone benchmark for studying powder flowability and re-coating processes at different speed as well as spatter formation and distribution after the melting process.

Figure 20:
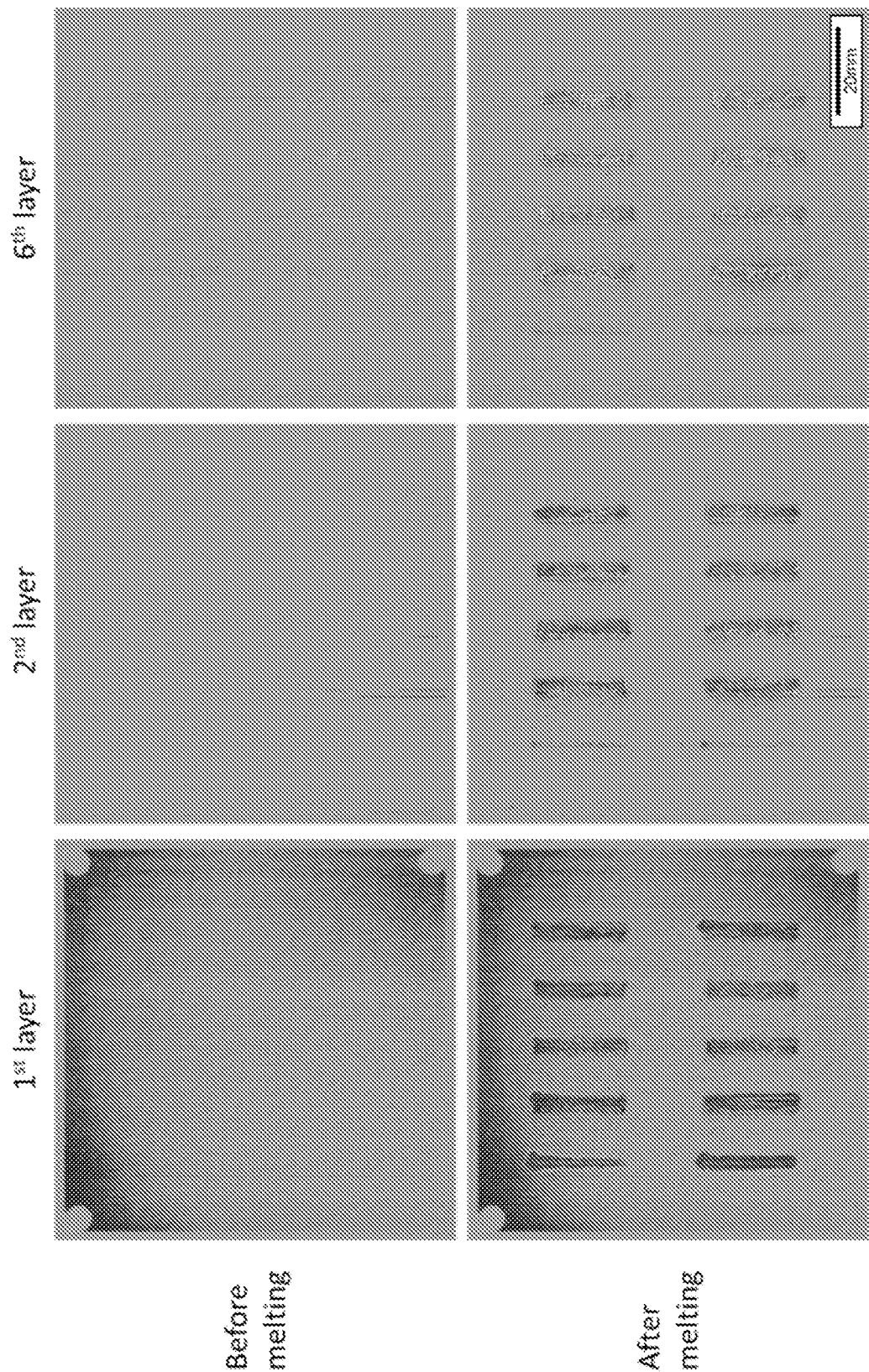
FIG. 20 depicts a compilation of different high-resolution and large field-of-view scans acquired right before and after melting process at $1^{st}$ layer, $2^{nd}$ layer and $6^{th}$ layer, according to various example embodiments of the present invention.

Example: Application of the Method for In-Line Evaluation of the Printing Process Parameters According to various example embodiments, another feature of the powder bed scanner is shown, being the ability to capture images of the entire build area right before and after the melting process, at a high resolution. FIG. 20 depicts a compilation of different high-resolution and large field-of-view scans right before and after melting process at $1^{st}$, $2^{nd}$ and $6^{th}$ layer. In particular, FIG. 20 shows a compilation of different images acquired before and after the melting process of the $1^{st}$, $2^{nd}$ and $6^{th}$ layer accordingly. This is a useful tool to understand the effect of powder bed quality and printing process parameters on the final part surface quality. By having this information in-line during the printing process, the parameter optimization process for new material feedstock may be accelerated.

Figure 21:
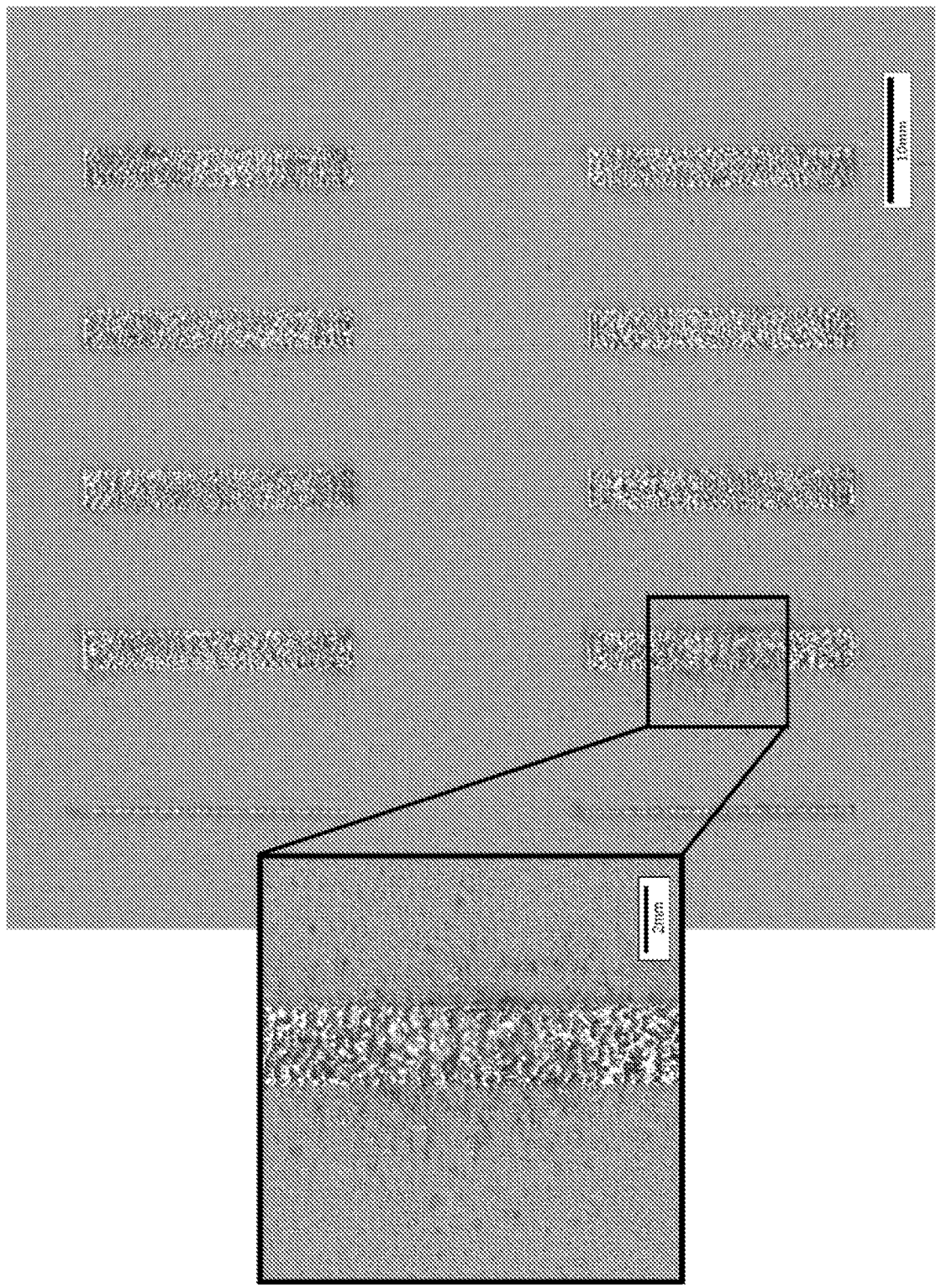
FIG. 21 depicts a detailed scan of the consolidated material at $6^{th}$ layer of an entire build after the melting process, according to various example embodiments of the present invention.

Moreover, some other valuable information can be extracted from these scans, including: melted surface quality, surface porosity, surface roughness as well as the geometrical accuracy of the entire build, to the level of powder particle (as seen in FIG. 21). The color and distribution of spatters (i.e., ejected particle during the laser melting process) can also be acquired, which can be used to infer the interaction between melting source and powder layer to determine the quality of the melting process. In particular, FIG. 21 depicts a detailed scan of the consolidated material at $6^{th}$ layer of the entire build after the melting process. Important information of the build quality including surface roughness, surface pores, surface darkening, melting and fusing quality as well as spatter size and distribution is obtained in-line with the printing process. Moreover, the topography of the consolidated surface can be obtained.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A method of monitoring a powder bed process in additive manufacturing, using at least one processor, the method comprising:
obtaining a first image of a powder bed layer from scanning the powder bed layer in a first scanning direction using a first contact image sensor, the powder bed layer being formed by a powder re-coater arm in the powder bed process and the first contact image sensor being attached to the powder re-coater arm;
determining a focus level property of the first image; and
detecting non-uniformities in the powder bed layer based on the focus level property of the first image.

2. The method according to claim 1, wherein said determining a focus level property of the first image comprises determining a focus level map of the first image.

3. The method according to claim 2, wherein said determining a focus level property of the first image further comprises performing a smoothening operation on the focus level map based on a box filter to obtain a smoothened focus level map.

4. The method according to claim 3, wherein said detecting non-uniformities in the powder bed layer comprises:
applying a threshold condition to the smoothened focus level map; and
identifying one or more regions of the powder bed layer corresponding to one or more regions of the smoothened focus level map satisfying the threshold condition as having non-uniformities.

5. The method according to claim 2, further comprising quantifying the focus level map of the first image to obtain a topography map of the first image.

6. The method according to claim 5, wherein said quantifying the focus level map comprises mapping focus level values in the focus level map to corresponding distances with respect to a focal plane to obtain the topography map.

7. The method according to claim 5, wherein said detecting non-uniformities in the powder bed layer comprises determining a degree of non-uniformities in the powder bed layer based on the topography map of the first image.

8. The method according to claim 1, further comprising:
obtaining a second image of a consolidated material layer from scanning the consolidated material layer in a second scanning direction, opposite to the first scanning direction, using the first contact image sensor, the consolidated material layer being formed with respect to the powder bed layer, or obtaining a second image of a consolidated material layer from scanning the consolidated material layer in the first scanning direction using a second contact image sensor, the consolidated material layer being formed with respect to an immediately previous powder bed layer and the second contact image sensor being attached to the powder re-coater arm at an opposite side thereof with respect to the first contact image sensor;
determining a focus level property of the second image; and
detecting non-uniformities in the consolidated material layer based on the focus level property of the second image.

9. The method according to claim 1, further comprising:
obtaining a second image of the powder bed layer from scanning the powder bed layer in the first scanning direction using a second contact image sensor, the second contact image sensor being attached to the powder re-coater arm at a same side thereof as the first contact image sensor and at a different distance from the powder bed layer to be scanned compared to the first contact image sensor;
determining a focus level property of the second image; and
determining, for each of one or more regions of the powder bed layer detected as having non-uniformities, whether the region having non-uniformities is a protrusion-type or a depression-type based on the focus level property of the second image at a corresponding region thereof.

10. A system for monitoring a powder bed process in additive manufacturing, the system comprising:
a first contact sensor;
a memory; and
at least one processor communicatively coupled to the memory and the first contact sensor, and configured to:
obtain a first image of a powder bed layer from scanning the powder bed layer in a first scanning direction using the first contact image sensor, the powder bed layer being formed by a powder re-coater arm in the powder bed process and the first contact image sensor being attached to the powder re-coater arm;
determine a focus level property of the first image; and
detect non-uniformities in the powder bed layer based on the focus level property of the first image.

11. The system according to claim 10, wherein said determine a focus level property of the first image comprises determining a focus level map of the first image.

12. The system according to claim 11, wherein said determine a focus level property of the first image further comprises performing a smoothening operation on the focus level map based on a box filter to obtain a smoothened focus level map.

13. The system according to claim 12, wherein said detect non-uniformities in the powder bed layer comprises:
applying a threshold condition to the smoothened focus level map; and
identifying one or more regions of the powder bed layer corresponding to one or more regions of the smoothened focus level map satisfying the threshold condition as having non-uniformities.

14. The system according to claim 11, wherein the at least one processor is further configured to quantify the focus level map of the first image to obtain a topography map of the first image.

15. The system according to claim 14, wherein said quantifying the focus level map comprises mapping focus level values in the focus level map to corresponding distances with respect to a focal plane to obtain the topography map.

16. The system according to claim 14, wherein said detect non-uniformities in the powder bed layer comprises determining a degree of non-uniformities in the powder bed layer based on the topography map of the first image.

17. The system according to claim 14, wherein the at least one processor is further configured to:
obtain a reference topography map of a reference powder bed layer free of non-uniformities; and
correct the topography map of the first image based on the reference topography map of the reference powder bed layer.

18. The system according to claim 10, wherein the at least one processor is further configured to:
obtain a second image of a consolidated material layer from scanning the consolidated material layer in a second scanning direction, opposite to the first scanning direction, using the first contact image sensor, the consolidated material layer being formed with respect to the powder bed layer, or obtain a second image of a consolidated material layer from scanning the consolidated material layer in the first scanning direction using the second contact image sensor, the consolidated material layer being formed with respect to an immediately previous powder bed layer and the second contact image sensor being attached to the powder re-coater arm at an opposite side thereof with respect to the first contact image sensor;

determine a focus level property of the second image; and detect non-uniformities in the consolidated material layer based on the focus level property of the second image.

19. The system according to claim 10, further comprising a second contact image sensor, wherein the at least one processor is further configured to:

obtain a second image of the powder bed layer from scanning the powder bed layer in the first scanning direction using the second contact image sensor, the second contact image sensor being attached to the powder re-coater arm at a same side thereof as the first contact image sensor and at a different distance from the powder bed layer to be scanned compared to the first contact image sensor;

determine a focus level property of the second image; and determining, for each of one or more regions of the powder bed layer detected as having non-uniformities, whether the region having non-uniformities is a protrusion-type or a depression-type based on the focus level property of the second image at a corresponding region thereof.

20. An additive manufacturing system configured to perform a powder bed process, the additive manufacturing system comprising:

a build platform;

a powder feeder configured to dispense powder on the build platform during the powder bed process;

a powder re-coater comprising a powder re-coater arm configured to form a powder bed layer on the build platform based on the powder dispensed on the build platform from the power feeder; and a system for monitoring the powder bed process in additive manufacturing, the system comprising:

a first contact sensor;

a memory; and at least one processor communicatively coupled to the memory and the first contact sensor, and configured to:

obtain a first image of the powder bed layer from scanning the powder bed layer in a first scanning direction using the first contact image sensor, the powder bed layer being formed by the powder re-coater arm in the powder bed process and the first contact image sensor being attached to the powder re-coater arm;

determine a focus level property of the first image; and detect non-uniformities in the powder bed layer based on the focus level property of the first image.

* * * * *